(12) United States Patent
Chatzidakis et al.

(10) Patent No.: US 12,243,308 B2
(45) Date of Patent: Mar. 4, 2025

(54) LEARNING ICONIC SCENES AND PLACES WITH PRIVACY

(71) Applicant: Apple Inc., Cupertino, CA (US)

(72) Inventors: Michael Chatzidakis, San Jose, CA (US); Kalu O. Kalu, Los Gatos, CA (US); Omid Javidbakht, Cupertino, CA (US); Sowmya Gopalan, Cupertino, CA (US); Eric Circlaeys, Los Gatos, CA (US); Rehan Rishi, San Jose, CA (US); Mayank Yadav, Paris (FR)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 17/658,474

(22) Filed: Apr. 8, 2022

(65) Prior Publication Data
US 2022/0392219 A1 Dec. 8, 2022

Related U.S. Application Data

(60) Provisional application No. 63/197,252, filed on Jun. 4, 2021.

(51) Int. Cl.
| | |
|---|---|
| G06F 16/90 | (2019.01) |
| G06F 16/906 | (2019.01) |
| G06F 16/908 | (2019.01) |
| G06V 20/50 | (2022.01) |

(52) U.S. Cl.
CPC ............ *G06V 20/50* (2022.01); *G06F 16/906* (2019.01); *G06F 16/908* (2019.01)

(58) Field of Classification Search
CPC .......................... G06F 16/906; G06F 16/908
See application file for complete search history.

(56) References Cited

U.S. PATENT DOCUMENTS

| | | | | |
|---|---|---|---|---|
| 8,856,121 B1 * | 10/2014 | Makki | ..................... | G06F 16/95 707/736 |
| 2019/0340255 A1 * | 11/2019 | Huyghe | ................. | G06F 40/284 |
| 2020/0104705 A1 * | 4/2020 | Bhowmick | ............... | G06N 3/04 |

* cited by examiner

*Primary Examiner* — Kristopher Andersen
(74) *Attorney, Agent, or Firm* — Blank Rome LLP

(57) ABSTRACT

Devices, methods, and non-transitory program storage devices (NPSDs) are disclosed herein to provide for the privacy-respectful learning of iconic scenes and places, wherein the learning is based on information received from one or more client devices in response to one or more collection criteria specified as part of one or more collection operations launched by a server device. In some embodiments, differential privacy techniques (such as the submission of predetermined amounts of noise-injecting, e.g., randomly-generated, data in conjunction with actual data) are employed by the client devices, such that any insights learned by the server device only relate to "hot spots," "themes," or other scenes, objects, and/or topics that are highly popular and captured in the digital assets (DAs) of many users, ensuring there is no way for the server device to learn or glean any insights related to particular users of individual client devices participating in the collection operations.

17 Claims, 10 Drawing Sheets

LEARNING ICONIC SCENES AND PLACES WITH PRIVACY

TECHNICAL FIELD

This disclosure relates generally to the field of image processing and image metadata analysis. More particularly, but not by way of limitation, it relates to techniques for using differential privacy to enhance a server's ability to glean meaningful insights from information about digital assets captured by client devices in a privacy-respectful manner.

BACKGROUND

Modern consumer electronics have enabled users to create, purchase, and amass considerable amounts of digital assets, or "DAs," such as images, videos, and other audio-visual or textual forms of media. For example, a computing system (e.g., a smartphone, a stationary computer system, a portable computer system, a media player, a tablet computer system, a wearable computer system or device, etc.) can store or have access to a collection of digital assets (also referred to as a DA collection) that includes hundreds or thousands of DAs.

Managing a DA collection can be a resource-intensive exercise for users. A digital asset management (DAM) system can assist with managing a DA collection. A DAM system represents an intertwined system incorporating software, hardware, and/or other services in order to manage, store, ingest, organize, retrieve, and present DAs in a DA collection. An important building block for at least one commonly available DAM system is a database. Databases comprise data collections that are organized as schemas, tables, queries, reports, views, and other objects. Exemplary databases include relational databases (e.g., tabular databases, etc.), distributed databases that can be dispersed or replicated among different points in a network, and object-oriented programming databases that can be congruent with the data defined in object classes and subclasses.

However, one problem associated with using databases for digital asset management is that the DAM system can become resource-intensive to store, manage, and update. That is, substantial computational resources may be needed to manage the DAs in the DA collection (e.g., processing power for performing queries or transactions, storage memory space for storing the necessary databases, etc.). Another related problem associated with using databases is that DAM cannot easily be implemented on a computing system with limited storage capacity without managing the assets directly (e.g., a portable or personal computing system, such as a smartphone or a wearable device). Consequently, a DAM system's functionality is generally provided by a remote device (e.g., an external data store, an external server, etc.), where copies of the DAs are stored, and the results are transmitted back to the computing system having limited storage capacity.

Thus, according to some DAM embodiments, a DAM may further comprise a knowledge graph metadata network (also referred to herein as simply a "knowledge graph" or "metadata network") associated with a collection of digital assets (i.e., a DA collection). The metadata network can comprise correlated metadata assets describing characteristics associated with digital assets in the DA collection. Each metadata asset can describe a characteristic associated with one or more digital assets (DAs) in the DA collection. For example, a metadata asset can describe a characteristic associated with multiple DAs in the DA collection, such as the location, day of week, event type, etc., of the one or more associated DAs. Each metadata asset can be represented as a node in the metadata network. A metadata asset can be correlated with at least one other metadata asset. Each correlation between metadata assets can be represented as an edge in the metadata network that is between the nodes representing the correlated metadata assets. According to some embodiments, the metadata networks may define multiple types of nodes and edges, e.g., each with their own properties, based on the needs of a given implementation.

In addition to the aforementioned difficulties that a user may face in managing a large DA collection (e.g., locating and/or retrieving multiple DAs representing an important or popular type of event, location, theme, object, or scenes), users may also struggle to determine (or be unable to spend the time it would take to determine) where (and/or when) other popular types of events, themes, objects, or scenes are located or going on in the world around them, especially if they are unfamiliar with a given geographic region that they may be visiting. While, in theory, a server device that had access to the relevant metadata information regarding a large number of users' DA collections, e.g., reflecting DAs of scenes captured by users all around the world, may readily be able analyze such metadata and identify popular types of events, themes, objects, and/or scenes near a particular user's location, users may not wish to share such detailed DA metadata information (or, indeed, the DAs themselves) with one or more third parties for that type of detailed analysis, e.g., due to privacy concerns.

Thus, there is a need for methods, apparatuses, computer readable media, and systems to provide users of client devices with more intelligent and privacy-respectful insights (e.g., driven by the use of differential privacy techniques) and suggestions of popular types of events, themes, objects, and/or scenes, e.g., based on an analysis of large numbers of de-identified and aggregated sets of image property information (e.g., as obtained from the knowledge graph metadata networks of many individual users) that are received at server device in response to one or more specified DA collection criteria.

SUMMARY

Devices, methods, and non-transitory program storage devices (NPSDs) are disclosed herein to provide for the privacy-respectful learning of iconic scenes and places, wherein the learning is based on information received from one or more client devices in response to one or more collection criteria specified as part of one or more collection operations launched by a server device. In some embodiments, various cryptographic protections, in conjunction with differential privacy techniques (such as the submission of predetermined amounts of noise-injecting, e.g., randomly-generated, data, optionally in conjunction with actual data) are employed by the client devices, such that any insights learned by the server only relate to "hot spots," "themes," or other scenes, objects, and/or topics that are highly popular and captured in the DAs of many users, and thereby ensuring that it is essentially statistically impossible for the server device to learn or glean any insights related to particular users of individual client devices participating in the collection operations.

Thus, according to some embodiments, there is provided a device, e.g., a client device, comprising: a memory; a display; and one or more processors operatively coupled to the memory, wherein the one or more processors are configured to execute instructions causing the one or more processors to: identify a first set of digital assets (DAs) related to a user of the device, wherein each digital asset in the first set of digital assets matches each of one or more specified criteria, and wherein each of the one or more specified criteria correspond to at least one property of a digital asset; generate a first list of image property sets, wherein the first list comprises an image property set for each digital asset in the first set of digital assets, and wherein each image property set in the first list comprises, for a particular digital asset from the first set of digital assets: a group of values for each of the particular digital asset's properties corresponding to the one or more specified criteria; generate a second list of image property sets, wherein the second list comprises a first number of noise-injecting image property sets, and wherein each noise-injecting image property set in the second list comprises: a group of generated digital asset property values corresponding to the one or more specified criteria, wherein at least one of the generated digital asset property values comprises a randomly-generated digital asset property value; and submit, to a server device, a third list of image property sets, wherein the third list of image property sets comprises the first list of image property sets and the second list of image property sets.

In some embodiments, the one or more specified criteria may be transmitted from the server device to the device. In some cases, at least one of the one or more specified criteria correspond to one or more of: a scene content property of a digital asset; a capture location property of a digital asset; or a capture time property of a digital asset. In other cases, the first number of noise-injecting image property sets may be determined, at least in part, based on a predetermined privacy setting, such as an epsilon ($\varepsilon$) differential privacy (DP) value.

According to other embodiments, there is provided a device, e.g., a server device, comprising: a memory; a display; and one or more processors operatively coupled to the memory, wherein the one or more processors are configured to execute instructions causing the one or more processors to: specify one or more collection criteria for digital assets captured by users of a first set of client devices, wherein each of the one or more specified collection criteria corresponds to at least one property of a digital asset; transmit the specified one or more collection criteria to the first set of client devices; and receive a list of image property sets, wherein: each image property set in the list of image property sets comprises a group of values, wherein the group of values comprises a value for each property corresponding to each of the one or more specified collection criteria, each image property set in the list is received from a particular client device from the first set of client devices, a first subset of the list of image property sets comprises image property sets that: (a) contain digital asset property values that match each of the one or more specified collection criteria, and (b) correspond to digital assets captured by a user of a client device from the first set of client devices, and a second subset of the list of image property sets comprise image property sets that: (c) contain at least one digital asset property value randomly-generated by a client device from the first set of client devices, and (d) do not correspond to any digital asset captured by a user of a client device from the first set of client devices. In some cases, at least one image property set may be received from each of two or more of the client devices from the first set of client devices.

In some embodiments, the instructions may further cause the one or more processors to accumulate a histogram of the counts of each unique group of values received in the image property sets of the list of the image property sets and, based on the accumulated histogram, further determine that one or more particular unique groups of values reflect a significant relationship between the values of the corresponding digital asset properties represented in the one or more particular unique groups of values, e.g., based on a particular unique group of values exceeding a predetermined significant count threshold for the histogram.

In some cases, the server device may also transmit a time interval for which image property sets related to the specified one or more collection criteria will be received. In other cases, the server device may further determine a system-wide privacy setting value, e.g., an $\varepsilon$ value, wherein the relative sizes of the first subset (i.e., real data) and the second subset (i.e., the client-generated noise data) are based, at least in part, on the determined privacy setting value.

In some cases, to further enhance system privacy, the server device may preferably delete image property sets received over a first time interval if a number of image property sets received over the first time interval is less than a predetermined threshold value (e.g., a threshold of 100 property sets received over a 24-hour period for a particular geographic region), and only accumulate image property sets received over the first time interval if the number of image property sets received over the first time interval is greater than or equal to the predetermined threshold value.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

Figure 1:
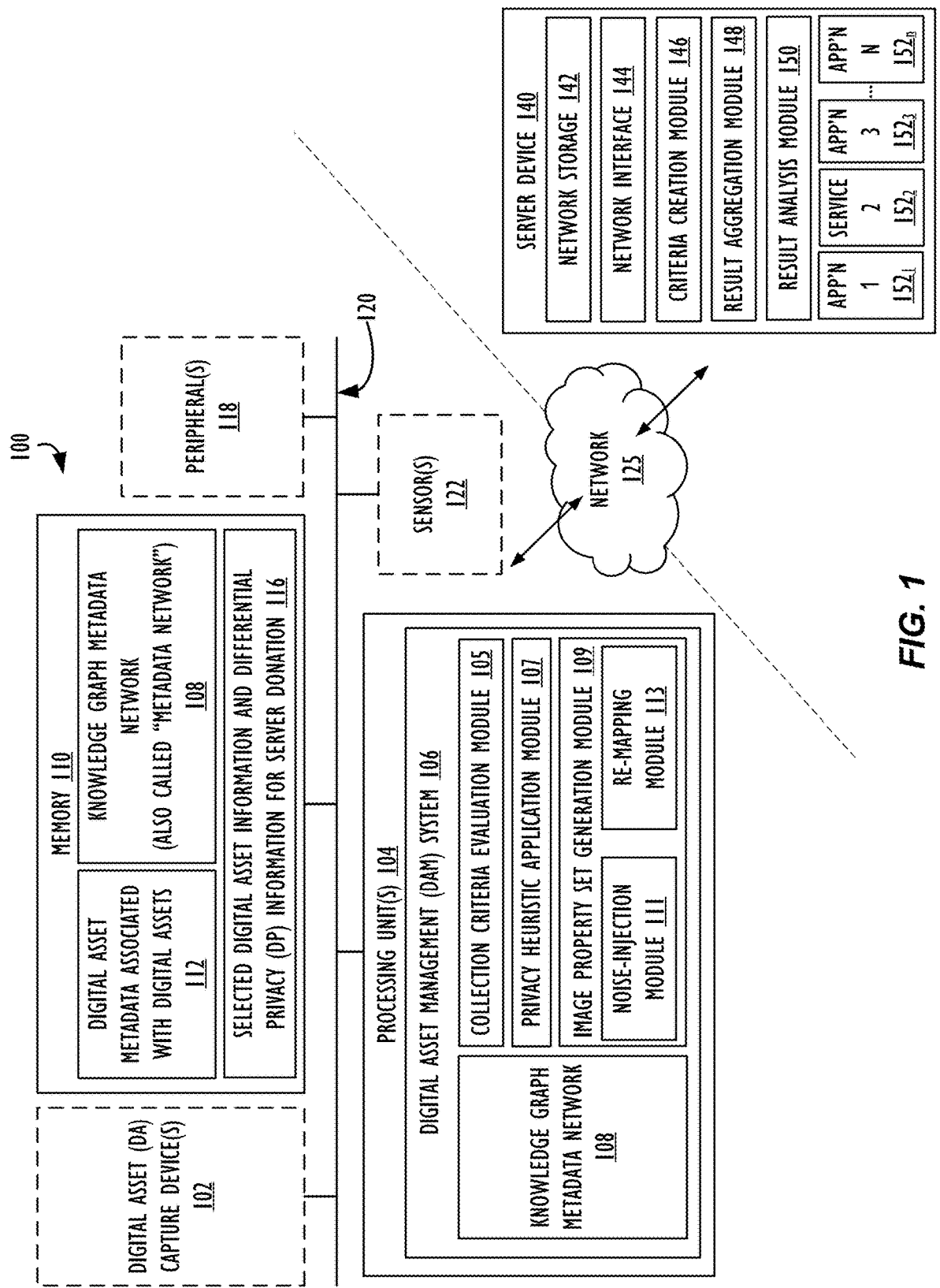
FIG. 1 illustrates, in block diagram form, a digital asset management (DAM) processing client system and a DAM processing server system, which each include electronic components for performing DAM, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Embodiments set forth herein can assist with improving computer functionality by enabling computing systems that use one or more embodiments of the digital asset management (DAM) systems described herein. Such computing systems can implement DAM to assist with reducing or eliminating the need for users to manually determine what DAs match one or more server-specified collection criteria for inclusion in a submission to a server device, e.g., for the purposes of learning scenes or places represented in such DAs in a privacy respectful manner across a large number of users. Such computing systems can also implement DAM to automatically generate noise-injecting information to include with the submission to the server device, in order to preserve the aforementioned privacy considerations.

This reduction or elimination can, in turn, assist with minimizing wasted computational resources (e.g., memory, processing power, computational time, etc.) that may be associated with using exclusively relational databases for DAM. For example, performing DAM via relational databases may include external data stores and/or remote servers (as well as networks, communication protocols, and other components required for communicating with external data stores and/or remote servers). In contrast, DAM performed as described herein (i.e., leveraging a knowledge graph metadata network) can occur locally on a device (e.g., a portable computing system, a wearable computing system, etc.) without the need for external data stores, remote servers, networks, communication protocols, and/or other components required for communicating with external data stores and/or remote servers.

Moreover, by automating the process of determining what DAs to include information about in a submission to a server device, users do not have to perform as much manual examination of their (often quite large) DA collections to determine what DAs might match each of the one or more collection criteria specified by a server device. Consequently, at least one embodiment of DAM described herein can assist with reducing or eliminating the additional computational resources (e.g., memory, processing power, computational time, etc.) that may be associated with a user's searching, sorting, tagging, and/or identifying qualifying DAs obtained manually from external relational databases in order to determine whether or not to include information regarding such DAs in a submission to be shared with one or more server devices.

Exemplary Client and Server Devices for Digital Asset Management and Learning of Iconic Scenes and Places with Privacy Turning now to FIG. 1, a digital asset management (DAM) processing client system 100 and a DAM processing server system device 140, which each include electronic components for performing DAM, are illustrated according to one or more embodiments. The system 100 can be housed in single computing system, such as a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Components in the system 100 can be spatially separated and implemented on separate computing systems that are operatively connected, as described in further detail below.

For one embodiment, the system 100 may include processing unit(s) 104, memory 110, a DA capture device(s) 102, sensor(s) 122, and peripheral(s) 118. For one embodiment, one or more components in the system 100 may be implemented as one or more integrated circuits (ICs). For example, at least one of the processing unit(s) 104, the DA capture device 102, the peripheral(s) 118, the sensor(s) 122, or the memory 110 can be implemented as a system-on-a-chip (SoC) IC, a three-dimensional (3D) IC, any other known IC, or any known IC combination. For another embodiment, two or more components in the system 100 are implemented together as one or more ICs. For example, at least two of the processing unit(s) 104, the DA capture device 102, the peripheral(s) 118, the sensor(s) 122, or the memory 110 are implemented together as an SoC IC. Each component of system 100 is described below.

As shown in FIG. 1, the system 100 can include processing unit(s) 104, such as CPUs, GPUs, other integrated circuits (ICs), memory, and/or other electronic circuitry. For one embodiment, the processing unit(s) 104 manipulate and/or process DA metadata associated with digital assets 112 or multimedia presentation data 116 associated with digital assets (e.g., preferred DA sequences, clusters, layouts, themes, transition types and durations, etc.). The processing unit(s) 104 may include a digital asset management (DAM) system 106 for performing one or more embodiments of DAM, as described herein. For one embodiment, the DAM system 106 is implemented as hardware (e.g., electronic circuitry associated with the processing unit(s) 104, circuitry, dedicated logic, etc.), software (e.g., one or more instructions associated with a computer program executed by the processing unit(s) 104, software run on a general-purpose computer system or a dedicated machine, etc.), or a combination thereof.

The DAM system 106 can enable the system 100 to generate and use a knowledge graph metadata network (also referred to herein more simply as "knowledge graph" or "metadata network") 108 of the DA metadata 112 as a multidimensional network. Metadata networks and multidimensional networks that may be used to implement the various techniques described herein are described in further detail in, e.g., U.S. Non-Provisional patent application Ser. No. 15/391,269, entitled "Notable Moments in a Collection of Digital Assets," filed Dec. 27, 2016 ("the '269 Application").

In one embodiment, the DAM system 106 can perform one or more of the following operations: (i) generate the metadata network 108; (ii) relate and/or present at least two DAs, e.g., as part of a moment or multimedia presentation, based on the metadata network 108; (iii) determine and/or present interesting DAs (or sets of DAs) in the DA collection to the user as viewing or sharing suggestions, based on the metadata network 108 and one or more other criterion; (iv) identify sets of DAs that match each of one or more collection criteria specified by a server device (and, optionally, meeting one or more predetermined privacy heuristics); and (v) generate and submit image property sets containing "noise" property values and, optionally, "actual" property values related to the identified sets of DAs to the server device. Additional details about the immediately preceding operations that may be performed by the DAM system 106 are described below and, particularly, in connection with FIGS. 5A-5D and 6A-6B.

The DAM system 106 can obtain or receive a collection of DA metadata 112 associated with a DA collection. As used herein, a "digital asset," a "DA," and their variations refer to data that can be stored in or as a digital form (e.g., a digital file etc.). This digitalized data includes, but is not limited to, the following: image media (e.g., a still or animated image, etc.); audio media (e.g., a song, etc.); text media (e.g., an E-book, etc.); video media (e.g., a movie, etc.); and haptic media (e.g., vibrations or motions provided in connection with other media, etc.). The examples of digitalized data above can be combined to form multimedia (e.g., a computer animated cartoon, a video game, a presentation, etc.). A single DA refers to a single instance of digitalized data (e.g., an image, a song, a movie, etc.). Multiple DAs or a group of DAs refers to multiple instances of digitalized data (e.g., multiple images, multiple songs, multiple movies, etc.). Throughout this disclosure, the use of "a DA" refers to "one or more DAs" including a single DA and a group of DAs. For brevity, the concepts set forth in this document use an operative example of a DA as one or more images. It is to be appreciated that a DA is not so limited, and the concepts set forth in this document are applicable to other DAs (e.g., the different media described above, etc.).

As used herein, a "digital asset collection," a "DA collection," and their variations refer to multiple DAs that may be stored in one or more storage locations. The one or more storage locations may be spatially or logically separated as is known.

As used herein, "metadata," "digital asset metadata," "DA metadata," and their variations collectively refer to information about one or more DAs. Metadata can be: (i) a single instance of information about digitalized data (e.g., a time stamp associated with one or more images, etc.); or (ii) a grouping of metadata, which refers to a group comprised of multiple instances of information about digitalized data (e.g., several time stamps associated with one or more images, etc.). There may also be many different types of metadata associated with a collection of DAs. Each type of metadata (also referred to as "metadata type") describes one or more characteristics or attributes associated with one or more DAs. Further detail regarding the various types of metadata that may be stored in a DA collection and/or utilized in conjunction with a knowledge graph metadata network are described in further detail in, e.g., the '269 Application, which was incorporated by reference above.

As used herein, "context" and its variations refer to any or all attributes of a user's device that includes or has access to a DA collection associated with the user, such as physical, logical, social, and other contextual information. As used herein, "contextual information" and its variations refer to metadata that describes or defines a user's context or a context of a user's device that includes or has access to a DA collection associated with the user. Exemplary contextual information includes, but is not limited to, the following: a predetermined time interval; an event scheduled to occur in a predetermined time interval; a geolocation visited during a particular time interval; one or more identified persons associated with a particular time interval; an event taking place during a particular time interval, or a geolocation visited during a particular time interval; weather metadata describing weather associated with a particular period in time (e.g., rain, snow, sun, temperature, etc.); season metadata describing a season associated with the capture of one or more DAs; relationship information describing the nature of the social relationship between a user and one or more third parties; or natural language processing (NLP) information describing the nature and/or content of an interaction between a user and one more third parties. For some embodiments, the contextual information can be obtained from external sources, e.g., a social networking application, a weather application, a calendar application, an address book application, any other type of application, or from any type of data store accessible via a wired or wireless network (e.g., the Internet, a private intranet, etc.).

Referring again to FIG. 1, for one embodiment, the DAM system 106 uses the DA metadata 112 to generate a metadata network 108. As shown in FIG. 1, all or some of the metadata network 108 can be stored in the processing unit(s) 104 and/or the memory 110. As used herein, a "knowledge graph," a "knowledge graph metadata network," a "metadata network," and their variations refer to a dynamically organized collection of metadata describing one or more DAs (e.g., one or more groups of DAs in a DA collection, one or more DAs in a DA collection, etc.) used by one or more computer systems. In a metadata network, there are no actual DAs stored—only metadata (e.g., metadata associated with one or more groups of DAs, metadata associated with one or more DAs, etc.). Metadata networks differ from databases because, in general, a metadata network enables deep connections between metadata using multiple dimensions, which can be traversed for additionally deduced correlations. This deductive reasoning generally is not feasible in a conventional relational database without loading a significant number of database tables (e.g., hundreds, thousands, etc.). As such, as alluded to above, conventional databases may require a large amount of computational resources (e.g., external data stores, remote servers, and their associated communication technologies, etc.) to perform deductive reasoning. In contrast, a metadata network may be viewed, operated, and/or stored using fewer computational resource requirements than the conventional databases described above. Furthermore, metadata networks are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. Metadata networks do more than access cross-referenced information—they go beyond that and involve the extrapolation of data for inferring or determining additional data. As alluded to above, the DAs themselves may be stored, e.g., on one or more servers remote to the system 100, with thumbnail versions of the DAs stored in system memory 110 and full versions of particular DAs only downloaded and/or stored to the system 100's memory 110 as needed (e.g., when the user desires to view or share a particular DA). In other embodiments, however, e.g., when the amount of onboard storage space and processing resources at the system 100 is sufficiently large and/or the size of the user's DA collection is sufficiently small, the DAs themselves may also be stored within memory 110, e.g., in a separate database, such as the aforementioned conventional databases.

The DAM system 106 may generate the metadata network 108 as a multidimensional network of the DA metadata 112. As used herein, a "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge-labeled multigraphs, multipartite edge-labeled multigraphs, and multilayer networks.

In one embodiment, the metadata network 108 includes two types of nodes—(i) moment nodes; and (ii) non-moments nodes. As used herein, "moment" shall refer to a contextual organizational schema used to group one or more digital assets, e.g., for the purpose of displaying the group of digital assets to a user, according to inferred or explicitly-defined relatedness between such digital assets. For example, a moment may refer to a visit to coffee shop in Cupertino, California that took place on Mar. 26, 2018. In this example, the moment can be used to identify one or more DAs (e.g., one image, a group of images, a video, a group of videos, a song, a group of songs, etc.) associated with the visit to the coffee shop on Mar. 26, 2018 (and not with any other moment).

As used herein, a "moment node" refers to a node in a multidimensional network that represents a moment (as is described above). As used herein, a "non-moment node" refers a node in a multidimensional network that does not represent a moment. Thus, a non-moment node may refer to a metadata asset associated with one or more DAs that is not a moment, e.g., a node associated with a particular person, location, or multimedia presentation. Further details regarding the possible types of "non-moment" nodes that may be found in an exemplary metadata network may be found e.g., the '269 Application, which was incorporated by reference above.

For one embodiment, the edges in the metadata network 108 between nodes represent relationships or correlations between the nodes. For one embodiment, the DAM system 106 updates the metadata network 108 as it obtains or receives new metadata 112 and/or determines new metadata 112 for the DAs in the user's DA collection.

The DAM system 106 can manage DAs associated with the DA metadata 112 using the metadata network 108 in various ways. For a first example, DAM system 106 may use the metadata network 108 to identify and/or donate information regarding sets of one or more DAs in a DA collection determined to match one or more specified criteria, wherein the identification of the matching DAs may be based on the correlations (i.e., the edges in the metadata network 108) between the DA metadata (i.e., the nodes in the metadata network 108) and/or one or more criterion. For this first example, the DAM system 106 may select the matching DAs based on moment nodes in the metadata network 108. In some embodiments, the DAM system 106 may suggest that a user views and/or shares metadata information related to the one or more identified DAs with one or more third parties, such as a server device that has specified the one more criterion in this first example. For a second example, the DAM system 106 may use the metadata network 108 and other contextual information gathered from the system (e.g., the user's relationship to a location, topic, or type of scene identified in the DAs related to one or moments, etc.) to apply one or more user-specified privacy heuristics to the identified DAs and filter out any DAs that do not meet the user-specified privacy heuristics from the process of donating information related to the identified DAs to one or more third parties, such as the server device that specified the one more criterion in the first example.

In some embodiments, the DAM system 106 can use a collection criteria evaluation module 105 to determine whether one or more eligible DAs from a user's DA collection match each of one or more specified criteria (e.g., criteria specified by a server device as part of a collection operation), wherein each of the one or more specified criteria correspond to at least one property of a DA. For example, if one of the specified criterion relates to a capture location property of a DA, the collection criteria evaluation module 105 may evaluate the capture location property of each eligible DA from the user's DA collection to see if it falls within the geographic location boundaries specified by the capture location-related criterion. As used herein, "eligible" DAs refers to a DA that a user has the legal right to share, a DA that the user has opted-in to sharing potential metadata about, a DA that satisfies any user-specified privacy heuristics in place, and a DA that is otherwise made accessible to server device-initiated collection operations. In some other embodiments, the DAM system 106 can use a privacy heuristic application module 107 to evaluate any of the aforementioned user-specified privacy heuristics that may be in place for a user's DA collection. In some cases, a privacy heuristic in place may comprise on or more of: an exclusion of DAs captured at a user's Home location; a limit on the total number of DAs that a user may donate information about in a given time period (e.g., no more than 5 records to be sent per day for a particular user); an exclusion of DAs containing certain sensitive subject matter (e.g., explicit subject matter, military-related subject matter, particular locations, particular people, etc.), and so forth.

In still other embodiments, the DAM system 106 can use an image property set generation module 109 to generate a list of image property sets for each matching DA whose information is going to be donated to a server device. For example, a noise injection model 111 may, for each such matching DA, generate a first number of noise-injecting image property sets, wherein each noise-injecting image property set comprises a group of generated digital asset property values corresponding to the one or more specified criteria, wherein at least one of the generated digital asset property values comprises a randomly-generated digital asset property value. In some cases, a first number of noise-injecting image property sets to be generated by noise injection model 111 may be determined based, at least in part, on a predetermined system-wide privacy setting, such as an epsilon ($\varepsilon$) differential privacy (DP) value. $\varepsilon$-differential privacy allows a data aggregation system to balance user privacy with the accuracy level achievable in analysis conducted on the collected data. For example, if the value of $\varepsilon$ is small, then more privacy is preserved, but data analysis accuracy gets worse. However, if $\varepsilon$ is large, then privacy preservation will be worse—but data accuracy may be improved. Thus, $\varepsilon$ values should preferably be selected to strike the correct balance between user privacy and data analysis accuracy for a given implementation. In addition to the statistical privacy protections provided by differential privacy, additional cryptographic protections may be provided, e.g., through a series of secure aggregation servers that enable even stronger security and privacy guarantees. In some such implementations, as long as one server remains uncompromised, a user's protected data cannot be linked to their identity, and only the aggregated sum of all user records could be successfully decoded by an attacker. In some cases, although statistically highly unlikely, it is possible that a given client device may submit only noise-injecting image property sets (or only image property sets that correspond to actual captured DAs) in response to a collection operation.

In other embodiments, the DAM system 106 may further use a remapping module 113, whose function may be to re-map values for one or more DA property values (e.g., a scene content property, a capture location property of a digital asset, or a capture time property) to a different value before being added to a group of values for an image property set to be submitted to a third party server device. For example, a DA scene content property of "Coffee" may be re-mapped to "Drink" before being transmitted back to a server device. Likewise, a DA capture location property of "Cupertino, CA" may be re-mapped to "Northern California" and/or a DA capture time property of "Mar. 26, 2018" may be re-mapped to simply "2018", again, before being transmitted back to a server device. The remapping of property values of a DA may have multiple benefits. For one, remapping may provide further privacy for the user by revealing less detailed information about the true content of their captured DAs to a server device. Simultaneously, the remapping of property values of a DA may also benefit a server device attempting to perform analysis on received data and needing a threshold number of counts of a given property value before being able to determine any significant relationships in the received data. For example, if each individual type of beverage identified in an eligible DA is reported back to the server as its own scene content property value, then no single beverage type will likely be reported back to the server in high enough numbers for the server to be able to determine that a particular type of beverage is popular during a particular time period and/or that a particular geographic region is a popular "hot spot" for users to drink a particular type of beverage. However, if all beverage type scene property values are remapped to the more generic "Drink" property value before submission for the server, then then the server may indeed have enough data to confirm that a particular geographic region is a popular "hot spot" for users to drink (e.g., perhaps indicative of a cluster of popular restaurants or bars).

The system 100 can also include memory 110 for storing and/or retrieving metadata 112, the metadata network 108, and/or selected digital asset information and differential privacy information (e.g., noise-injecting information) information intended for server donation 116, e.g., derived from the metadata 112 and/or randomly generated by noise-injection module 111. The metadata 112, the metadata network 108, and/or the information 116 may also be generated, processed, and/or captured by the other components in the system 100. For example, the metadata 112, the metadata network 108, and/or the information 116 may include data generated by, captured by, processed by, or associated with one or more peripherals 118, the DA capture device(s) 102, or the processing unit(s) 104, etc. The system 100 can also include a memory controller (not shown), which includes at least one electronic circuit that manages data flowing to and/or from the memory 110. The memory controller can be a separate processing unit or integrated in processing unit(s) 104.

The system 100 can include a DA capture device(s) 102 (e.g., an imaging device for capturing images, an audio device for capturing sounds, a multimedia device for capturing audio and video, any other known DA capture device, etc.). Device 102 is illustrated with a dashed box to show that it is an optional component of the system 100. For one embodiment, the DA capture device 102 can also include a signal processing pipeline that is implemented as hardware, software, or a combination thereof. The signal processing pipeline can perform one or more operations on data received from one or more components in the device 102. The signal processing pipeline can also provide processed data to the memory 110, the peripheral(s) 118 (as discussed further below), and/or the processing unit(s) 104.

The system 100 can also include peripheral(s) 118. For one embodiment, the peripheral(s) 118 can include at least one of the following: (i) one or more input devices that interact with or send data to one or more components in the system 100 (e.g., mouse, keyboards, etc.); (ii) one or more output devices that provide output from one or more components in the system 100 (e.g., monitors, printers, display devices, etc.); or (iii) one or more storage devices that store data in addition to the memory 110. Peripheral(s) 118 is illustrated with a dashed box to show that it is an optional component of the system 100. The peripheral(s) 118 may also refer to a single component or device that can be used both as an input and output device (e.g., a touch screen, etc.). The system 100 may include at least one peripheral control circuit (not shown) for the peripheral(s) 118. The peripheral control circuit can be a controller (e.g., a chip, an expansion card, or a stand-alone device, etc.) that interfaces with and is used to direct operation(s) performed by the peripheral(s) 118. The peripheral(s) controller can be a separate processing unit or integrated in processing unit(s) 104. The peripheral(s) 118 can also be referred to as input/output (I/O) devices 118 throughout this document.

The system 100 can also include one or more sensors 122, which are illustrated with a dashed box to show that the sensor can be optional components of the system 100. For one embodiment, the sensor(s) 122 can detect a characteristic of one or more environs. Examples of a sensor include, but are not limited to: a light sensor, an imaging sensor, an accelerometer, a sound sensor, a barometric sensor, a proximity sensor, a vibration sensor, a gyroscopic sensor, a compass, a barometer, a heat sensor, a rotation sensor, a velocity sensor, and an inclinometer.

For one or more embodiments, the system 100 also includes communication mechanism 120. The communication mechanism 120 can be, e.g., a bus, a network, or a switch. When the technology 120 is a bus, the technology 120 is a communication system that transfers data between components in system 100, or between components in system 100 and other components associated with other systems (not shown). As a bus, the technology 120 includes all related hardware components (wire, optical fiber, etc.) and/or software, including communication protocols. For one embodiment, the technology 120 can include an internal bus and/or an external bus. Moreover, the technology 120 can include a control bus, an address bus, and/or a data bus for communications associated with the system 100. For one embodiment, the technology 120 can be a network or a switch. As a network, the technology 120 may be any network such as a local area network (LAN), a wide area network (WAN) such as the Internet, a fiber network, a storage network, or a combination thereof, wired or wireless. When the technology 120 is a network, the components in the system 100 do not have to be physically co-located. Separate components in system 100 may be linked directly over a network even though these components may not be physically located next to each other. For example, two or more of the processing unit(s) 104, the communication technology 120, the memory 110, the peripheral(s) 118, the sensor(s) 122, and the DA capture device(s) 102 may be in distinct physical locations from each other and be communicatively coupled via the communication technology 120, which may be a network or a switch that directly links these components over a network 125.

In some cases, the client device 100 may be communicatively coupled via the network 125 to the server device 140. The server device 140 may include electronic components for specifying, performing, managing, and/or analyzing the collection operations described herein, which are configured to help the server device 140 be able to learn iconic scenes and places in a privacy-respectful manner. The server device 140 can be housed in single computing system, such as a computer server, virtual machine, virtual container, etc. or may be housed within multiple computing systems, such as a computer server system, multiple virtual machines, virtual containers, etc. In some cases, various components of the server device 140 may be spatially or logically separated and implemented on separate computing systems that are networked together via an internal network, such as a LAN, WAN, etc. The server device 140 may include network storage 142 (e.g., to store collection criteria, information received from client devices, collection operation analysis results, etc.), one or more network interfaces 144 for communicating with client devices via network 125, and potentially with other server devices 140, if so configured.

In some cases, the server device 140 may have modules to perform various functions related to the collection operations described herein, such as criteria creation module 146 (e.g., which is responsible for creating, updating, and/or modifying sets of specified criteria for various collection operations), result aggregation module 148 (which may, e.g., comprise a histogram of accumulated results received from client devices, as described in further detail below with reference to FIG. 3), and/or a result analysis module 150 (e.g., which may be tasked with deriving, deducing, and/or inferring significant relationships in the aggregated results data).

The server device 140, in some cases, may have or may be able to access various services and/or applications $152_1$-$152_N$, such as a geohashing service configured to translate received geohashes to latitude/longitude location information, or various other applications, which may, e.g., launch user experiences driven by the significant relationships derived from the collection operations (e.g., suggesting the display or playback of certain of a user's DAs featuring content that appears to be popular in an area the user is currently located, suggesting or offering products, services, or experiences that appear to be popular in an area the user is currently located, etc.).

Exemplary Geographic Regions, Image Property Sets, and Learned Scenes

Figure 2:
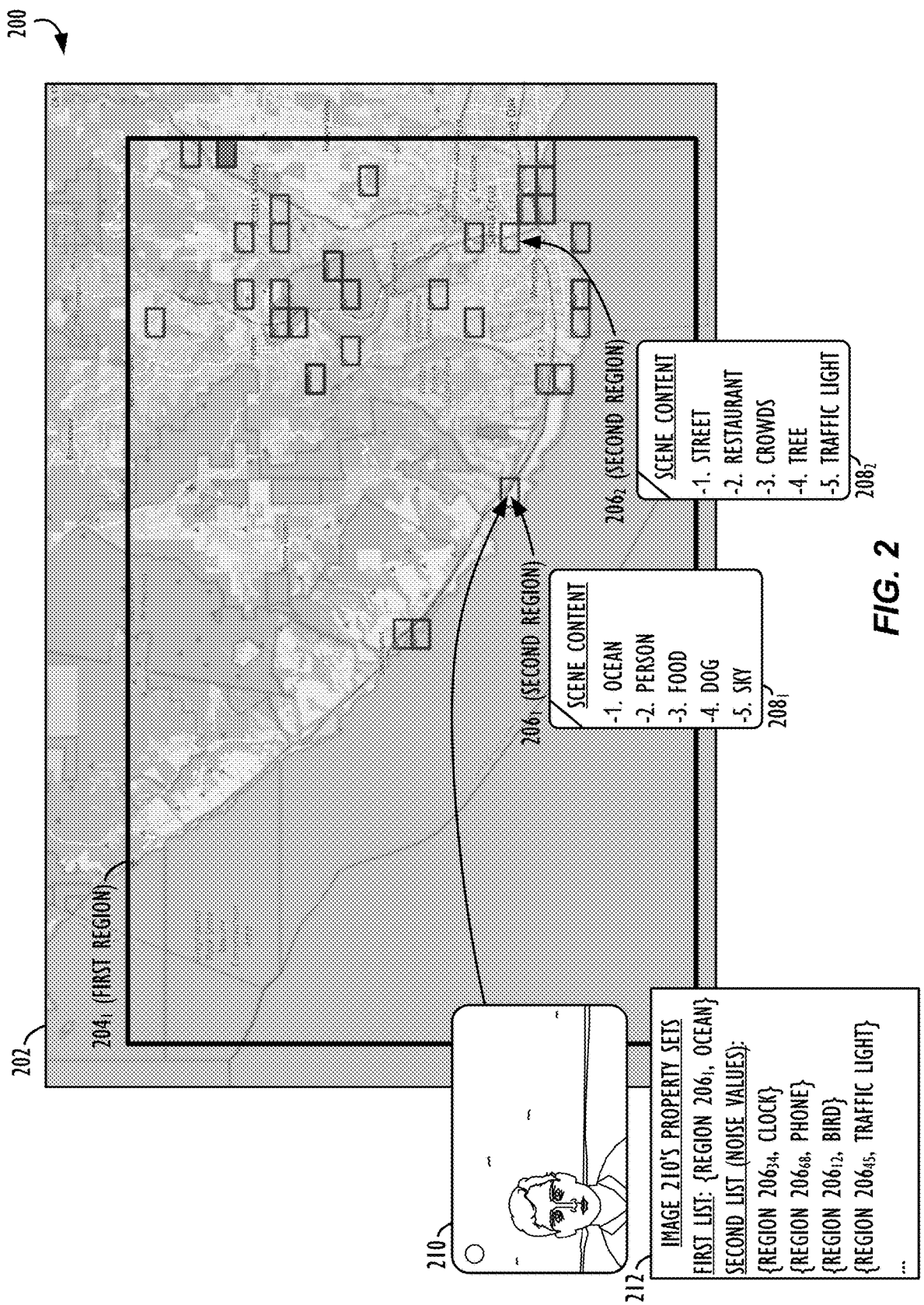
FIG. 2 illustrates an example of a map showing various geographic regions, exemplary learned scenes, and an exemplary captured image and its corresponding image property sets, according to one or more embodiments.

Tuning now to FIG. 2, an example 200 of a map 202 showing various geographic regions 204/206, exemplary learned scenes 208, and an exemplary captured image 210 and its corresponding image property sets 212 is shown, according to one or more embodiments. Map 202 is an example of a map covering a relatively large portion of Northern California, including portions of both land and water. Within map 202 is a first region labeled $204_1$. The size of first region $204_1$ is purely illustrative, and any desired region size may be used for a given implementation. Likewise, map 202 could possibly have encompassed more than one region the size of first region $204_1$. In some cases, the size of first region $204_1$ may represent an area over which a server device desires to learn new insights and/or derive significant relationships from information regarding metadata related to users' DAs that were captured in first region $204_1$ and received via one or more collection operations, as described herein. In some such cases, two or more second regions 206 may be distributed across each first region 204. In some cases, the second regions 206 may be tiled across each first region 204, e.g., in an equal number of equally-sized rows and columns of tiles, although such a distribution is not necessary, and, e.g., non-uniform sizes and/or distributions of second regions across a first region may also be possible, in some implementations. In some cases, the size of second regions 206 may represent the smallest and most granular area over which a server device may be able to learn a particular insight and/or derive a significant relationship from the information received via one or more collection operations.

In some cases, the size of first region $204_1$ may be defined by a geohash region having a particular precision level, e.g., a geohash with 4-digits, which represents an area roughly 39 km by 19.5 km. In some such cases, the size of second regions 206 may also be defined by a geohash region having a particular precision level, e.g., a geohash with 6-digits, which represents an area roughly 1.2 km by 0.61 km. Although such a size relationship between the first and second regions is merely exemplary, and the exact region sizes selected by a given implementation may be determined as a tradeoff between privacy and data analysis accuracy, the use of geohash sizes 6 and 4 present a scenario where 32 rows by 32 columns, or 1,024 total second region tiles 206N are located within the first region $204_1$, wherein the subscript N may be used herein to refer to an individual index into the second regions located within a given first region. In other words, element $206_1$ in FIG. 2 refers to the second region having an index of 1, element $206_2$ in FIG. 2 refers to the second region having an index of 2, element $206_{34}$ in FIG. 2 refers to the second region having an index of 34, and so forth.

As illustrated in FIG. 2, exemplary captured image 210 has been captured in second region $206_1$ by a user of client device. In this example, the user's DAM may have classified or otherwise associated the image 210 with one or more scene types of interest, e.g., "ocean," in this case, since the photo reflects a photo of a human subject on a beach located in second region $206_1$. As may be understood, although not discussed here, one or more additional scenes of interest may also have been identified for image 210.

As will be described in further detail below, e.g., with reference to FIG. 5A, according to some embodiments, in response to image 210 matching one or more collection criteria specified by a server device, the user's client device may generate a first list of image property sets, wherein the first list comprises an image property set for each eligible digital asset in the user's DA collection matching the one or more specified collection criteria. In this case, the first list comprises the group of values: {Region $206_1$, Ocean}. In some cases, these individual property values in a group of values may be concatenated or otherwise combined into an image property set. Likewise, the user's client device may also generate a second list of image property sets, wherein the second list comprises a first number of noise-injecting image property sets, and wherein each noise-injecting image property set in the second list comprises a group of generated digital asset property values corresponding to the one or more specified criteria, wherein at least one of the generated digital asset property values comprises a randomly-generated digital asset property value. In this case, the second list comprises a plurality of groups of randomly-generated values, including: {Region $206_{34}$, Clock}, {Region $206_{68}$, Phone}, {Region $206_{12}$, Bird}, and, {Region $206_{45}$, Traffic Light}. Based on the predetermined privacy setting of a given implementation (such as an epsilon differential privacy value), the client device may generate 5, 10, 20, 30, or more randomly-generated or otherwise "fake" image property sets for each "real" image property set in the first list. In other words, the user of the client device in this example did not actually take a photo of a clock while at the second region within first region $204_1$ with index 34, or a picture of a phone while at the second region within first region $204_1$ with index 68, etc. However, the first list and second list will be combined into a third list before submission to the server device, and the server device will not be able to discern which received image property sets in the third list are related to "fake" image property sets and which relate to "real" image property sets. As mentioned above, in some cases, although statistically highly unlikely, it is possible that a given client device may submit only noise-injecting image property sets (or only image property sets that correspond to actual captured DAs) in response to a given collection operation.

Thus, only by particular unique groups of image property values being received at the server with counts that exceed a predetermined count threshold will the server be able to discern whether particular groups of values do in fact represent significant relationships. For example, if photos of the ocean are in fact commonly captured by users in second region $206_1$, then this relationship will eventually rise above the level of random "noise" image property set data received at the server device (e.g., the presence of clocks in images captured in second region $206_{34}$), a significant relationship between the ocean and second region $206_1$ may be identified, while the other groups of values received at counts below the count threshold value may simply be ignored. As may now be understood, in the process of determining this significant relationship, the server device will not see any actual DAs captured by users, nor will it be able to know the locations of such DAs at any granularity smaller than that of the size of the second region (e.g., roughly 1.2 km by 0.61 km, in this example). Due to the various privacy protections put in place by the embodiments described herein, it will also essentially be statistically impossible for the server device to learn or discover which users submitted the information that led to any particular insights or significant relationships determined from the submitted data.

Over time, and by designing particular collection operations, the server device may be able to learn one or more scenes for various parts of the first region $204_1$ in a completely privacy-respectful manner. For example, as illustrated in FIG. 2, the top five most common learned scenes $208_1$ from DAs captured in second region $206_1$ (i.e., the aforementioned beach area where image 210 was captured) during the duration of a particular collection operation were: ocean, person, food, dog, and sky. This is possibly to be expected from a region that includes a beach. Similarly, the top five most common learned scenes $208_2$ from DAs captured in second region $206_2$ (i.e., relating to downtown Santa Cruz, CA) during the duration of the particular collection operation were: street, restaurant, crowds, tree, and traffic light. This is also to be expected from a region that includes a more urban area. Learning these scenes may allow the server device to drive particular context-aware user experiences for users of client devices. For example, a user's DAM could surface or otherwise feature a user's captured images of oceans any time the user traveled near second region $206_1$, e.g., to remind the user of past trips to beaches. As another example, a user's DAM could surface or otherwise feature a user's captured images of food from favorite restaurants when the user traveled near second region $206_2$, e.g., to remind the user of past visits to restaurants in the area or elsewhere. All this would be possible, even if the user themself never submitted any information to the server device in response to a collection operation, since the insights are derived from de-identified and crowdsourced information across a wide number of users.

Server Device Analysis of Received Image Property Sets

Figure 3:
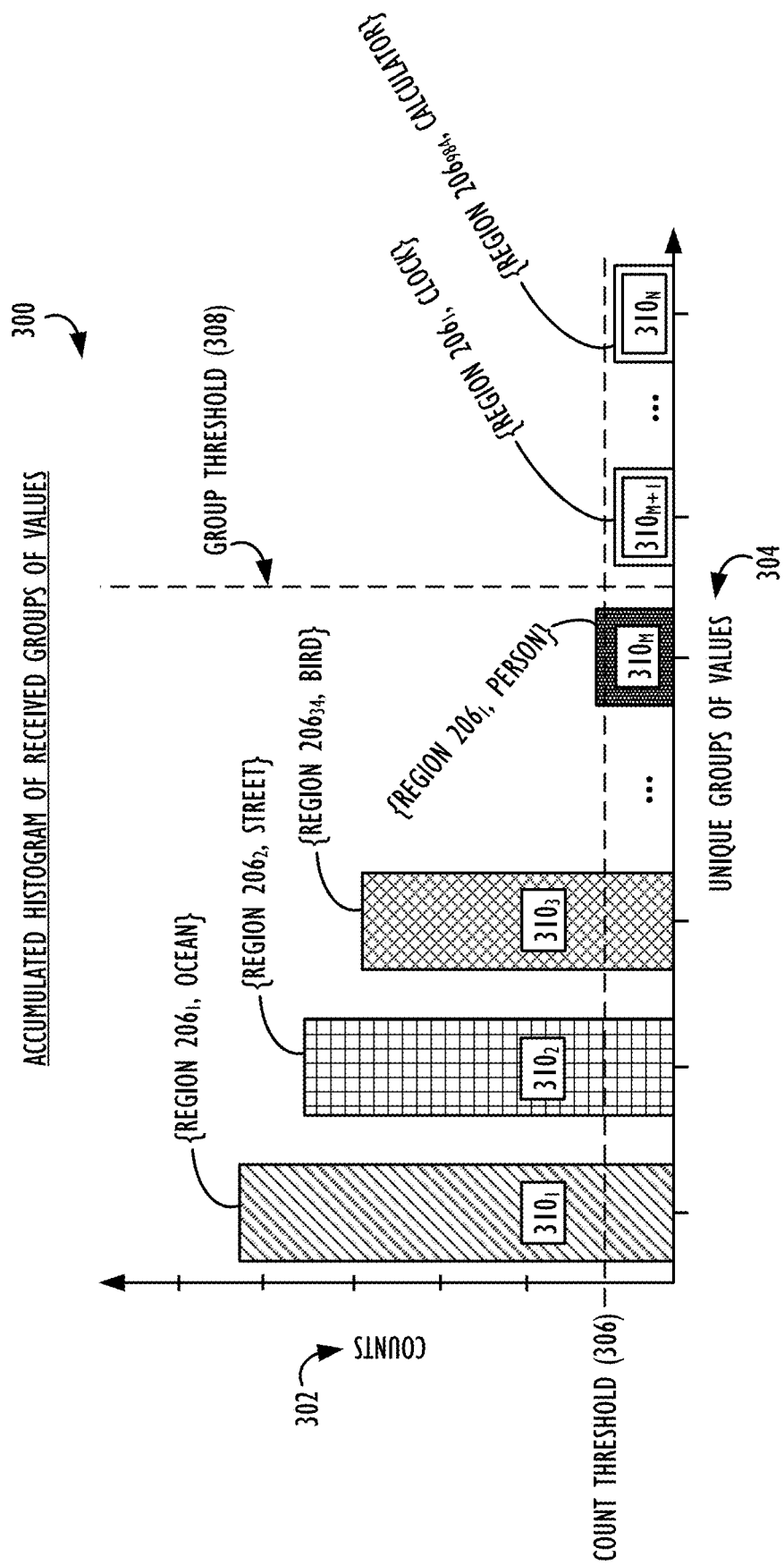
FIG. 3 illustrates an accumulated histogram of groups of values received by a server device in response to one or more collection criteria transmitted to a first set of client devices, according to one or more embodiments.

Turning now to FIG. 3, an accumulated histogram 300 of groups of values received by a server device in response to one or more collection criteria transmitted to a first set of client devices is illustrated, according to one or more embodiments. Histogram 300 has a y-axis 302 that reflects the counts of individual received groups of values, e.g., in response to one or more collection operations initiated by a server device. The x-axis 304 of histogram 300 may comprise one entry for each possible unique groups of values that may be received.

Turning back to the example illustrated in FIG. 2, assuming each group of values $310_N$ comprises a combination of: a single capture location property value (from among 1,024 possible capture locations within the first region); and a single a scene content property value (from among, say, 100 possible types of scenes that the server may be interested in learning information about), then the x-axis of histogram 300 will include values for 1,024 times 100, or 102,400 unique groups of values, i.e., ranging from group $310_1$ all the way to group $310_{102,400}$, in this example. As mentioned above, due to the application of differential privacy techniques (such as the injection of large amounts of noise data into the results returned to the server), many of the counts for the 102,400 possible unique groups of values will fall below the count threshold 306. Thus, there may also be a determined group threshold 308, above which may reflect groups where a significant relationship between the values in the groups of values does exist (e.g., Oceans in region $206_1$, Streets in region $206_2$, Birds in region $206_{34}$, and Persons in region $206_1$), and below which may reflect random "noise" groups, where a significant relationship between the values in the groups of values does not exist (e.g., Clocks in region $206_1$ and Calculators in region $206_{984}$). As illustrated in FIG. 3, wherein the groups have been sorted by count value, there may be M groups that exceed the count threshold 306, and then N-M groups that do not exceed the count threshold 306.

Learned Scenes Maps and Crowdsourced Themes

Figure 4:
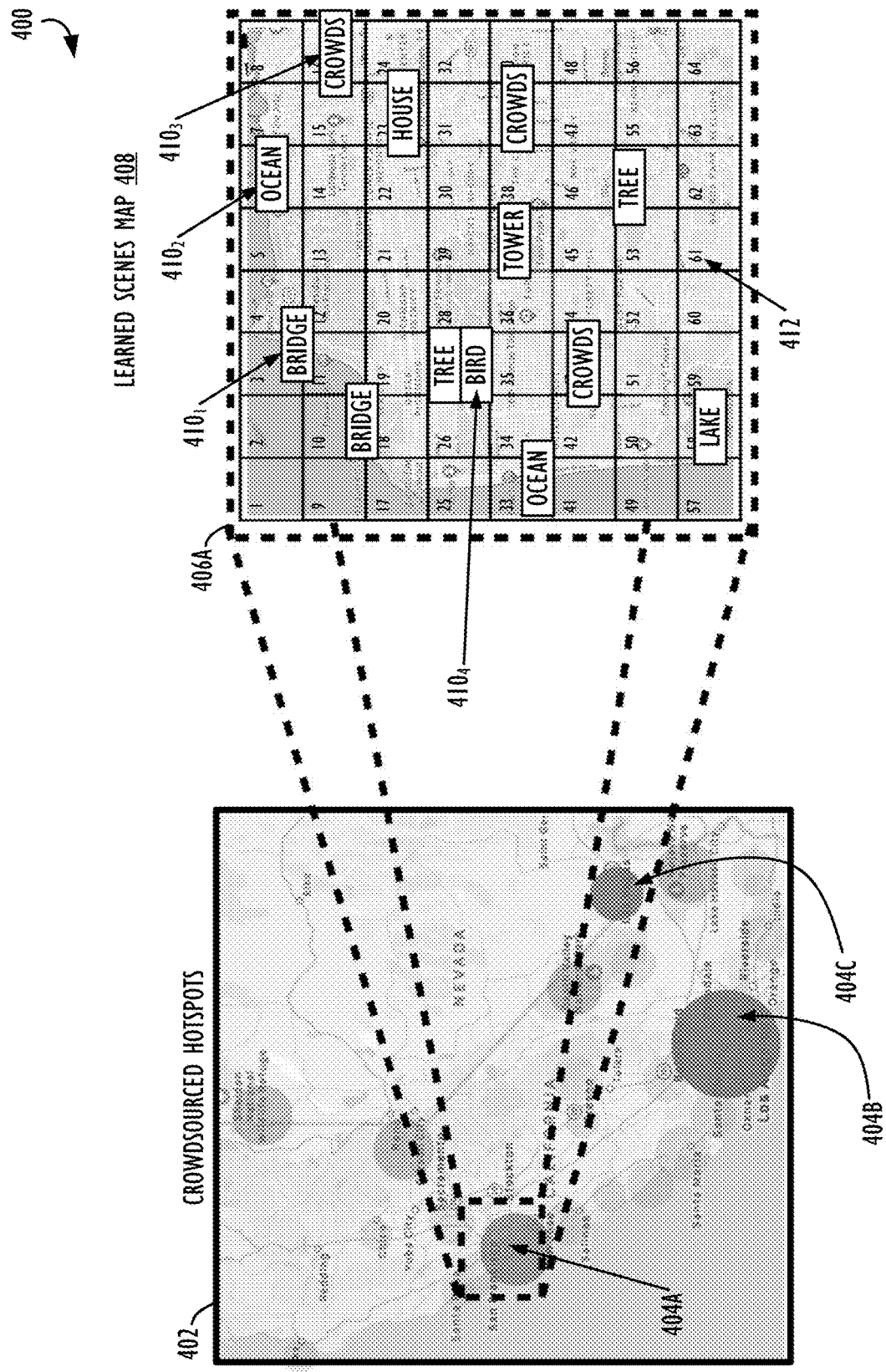
FIG. 4 illustrates an example of a crowdsourced hotspots map and a corresponding learned scenes map, according to one or more embodiments.

Turning now to FIG. 4, an example 400 of a crowdsourced hotspots map 402 and a corresponding learned scenes map 408 is shown, according to one or more embodiments. Crowdsourced hotspots map 402 may comprise a heat map showing various so-called "hot spots" 404, such as San Francisco (404A), Los Angeles (404B), and Las Vegas (404C). In some embodiments, hot spots may simply represent geographic regions wherein a sufficient number of eligible and matching DAs were returned to a server device in response to a collection operation that further analysis and learning may be performed by the server device in a privacy-respectful manner, e.g., as detailed elsewhere herein.

Learned scenes map 408 may comprise an annotated geographic map corresponding to a region 406A, over which significant relationships or other insights may have been learned by a server device, e.g., via one or more collection operations. In this case, region 406A is a magnified region from within the hotspot corresponding roughly to San Francisco (404A), i.e., a region in which a sufficient number of eligible and matching DAs were returned to the server device for the server's analysis to be performed in a privacy-respectful manner. For illustrative purposes, region 406A has been divided into eight equally-sized rows and columns of tiles, indexed with numbers 1 through 64, as shown by indices 412 in FIG. 4, although, as described above with reference to FIG. 2, more (or fewer) region tiles, e.g., 1,024 tiles, may be defined within a given region that is being analyzed.

Learned scenes map 408 comprises various annotations 410, reflective of learned significant relationships related to DAs captured within region 406A. As described above with reference to FIG. 3, according to some embodiments, the various annotations 410 on learned scenes map 408 may reflect unique groups of values received at the server device with counts higher than a predetermined noise threshold level. For example, learned scenes map 408 reflects, among other things, that: DAs including imagery of bridges are common at tile index 3 (410$_1$); DAs including imagery of oceans are common at tile index 6 (410$_2$); and DAs including imagery of crowds are common at tile index 16 (410$_3$). As explained elsewhere here, various appropriate user experiences may then be offered or initiated for users based on these learned significant relationships. For example, if a DAM was creating a photo album or multimedia presentation for a user including DAs captured within exemplary region 406A, in some embodiments, the DAM may select a "cover photo" or "featured photo" for the photo album or multimedia presentation that included content that was popular/representative of the region. For example, it may be more appropriate to select a DA captured within tile index 3 (410$_1$) that included a bridge, than, say, a DA captured within tile index 6 (410$_2$) that happened to include a plate of food, to serve as a cover photo or featured photo for a photo album or multimedia presentation related to a user's visit to exemplary region 406A. As another example, if a user were to enter (or approach) tile index 27 (410$_4$), it may be appropriate for the user's device to automatically launch a website or PDF guide related to "birds," since tile index 27 is known to be a hotspot for birds. It is to be understood that these examples are merely illustrative of the many appropriate user experiences and/or settings that could be determined, at least in part, based on the learned significant relationships for a particular region.

Exemplary Client Device Methods for Submitting Privacy-Respectful Image Property Sets to a Server Device in Response to Specified Criteria FIGS. 5A-5D are flow charts illustrating various details regarding a method of submitting image property sets from a client device to a server device in a privacy-respectful manner, and in response to one or more specified criteria, according to various embodiments.

Figure 5A:
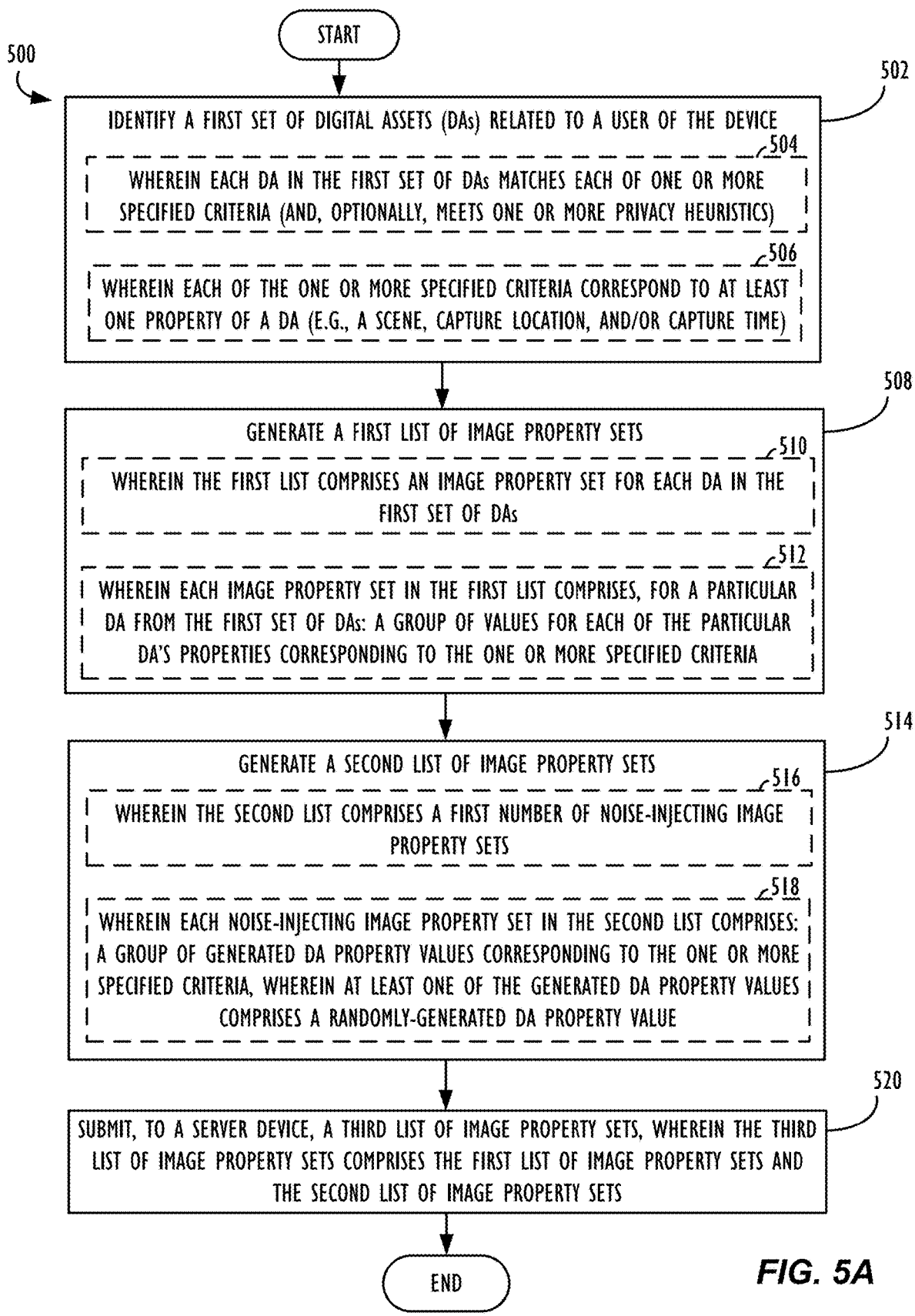
FIGS. 5A-5D are flow charts illustrating various details regarding a method of submitting image property sets from a client device to a server device in a privacy-respectful manner, and in response to one or more specified criteria, according to various embodiments.

Turning first to FIG. 5A, a method 500 is illustrated beginning with Step 502, wherein a client device may identify a first set of digital assets (DAs) related to a user of the device. In some cases, each DA in the first set of DAs will have been identified based on it matching each of one or more specified criteria (and, optionally, meeting one or more privacy heuristics, such as the various exemplary privacy heuristics described above) (Step 504). In other cases, each of the one or more specified criteria may correspond to at least one property of a DA (e.g., a scene, capture location, and/or capture time) (Step 506).

Next, at Step 508, the client device may generate a first list of image property sets. In some cases, the first list may comprise an image property set for each DA in the first set of DAs (Step 510). In other cases, each image property set in the first list comprises, for a particular DA from the first set of DAs: a group of values (e.g., in the form of a concatenated list) for each of the particular DA's properties corresponding to the one or more specified criteria (Step 512).

Next, at Step 514, the client device may generate a second list of image property sets. In some cases, the second list may comprise a first number of noise-injecting image property sets (Step 516). In other cases, each noise-injecting image property set in the second list comprises: a group of generated DA property values corresponding to the one or more specified criteria, wherein at least one of the generated DA property values comprises a randomly-generated DA property value (Step 518).

Finally, at Step 520, the client device may submit, to a server device, a third list of image property sets, wherein the third list of image property sets comprises the first list of image property sets and the second list of image property sets (e.g., in a randomized order or an ordering (e.g., an alphabetical or alphanumerical ordering) wherein the server device cannot otherwise discern which image property sets relate to actual captured DAs of a user and which image property sets are noise-injecting property sets, e.g., property sets containing at least one DA property value randomly-generated by a client device, and which does not correspond to any actual DA captured by a user of a client device.

Figure 5B:
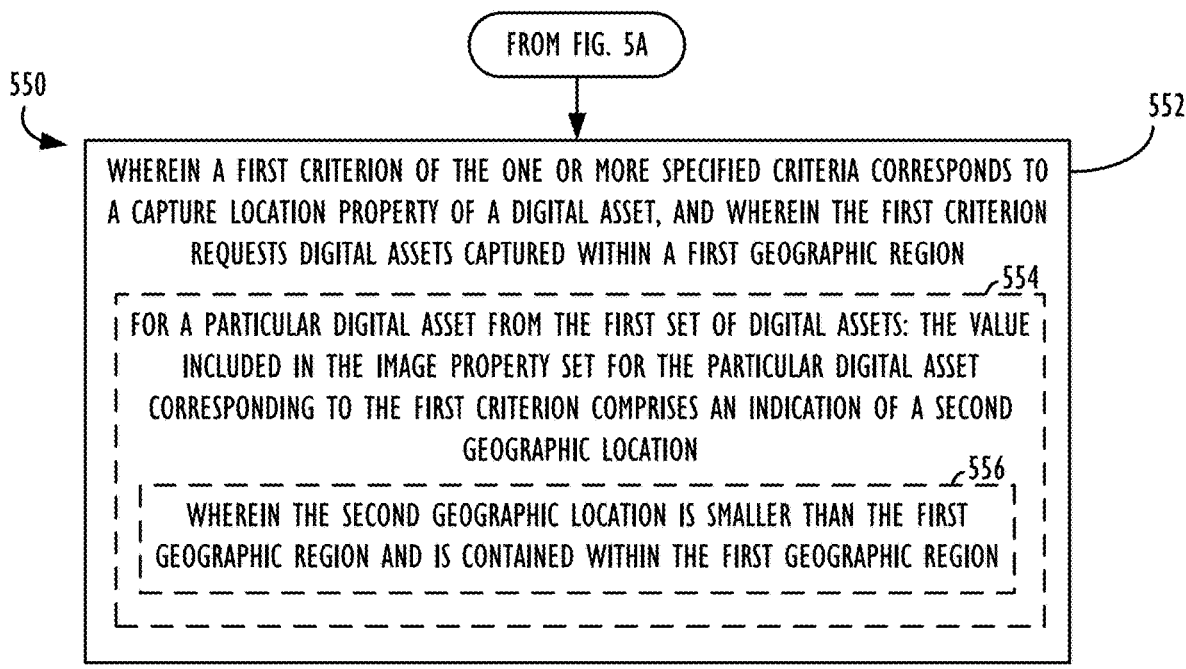

Turning now to FIG. 5B, a flowchart 550 is shown, illustrating additional details for enhancing and/or refining various steps of method 500 shown in FIG. 5A. Beginning with Step 552, an enhancement to Step 504 is described, wherein a first criterion of the one or more specified criteria corresponds to a capture location property of a digital asset, and wherein the first criterion requests digital assets captured within a first geographic region (e.g., a first rectangular geographic region having a predefined location and certain defined dimensions, such as dimensions defined by a first number of digits appearing in a geohash string identifying the first geographic region). At Step 554, a further refinement of Step 552 is presented, wherein, for a particular digital asset from the first set of digital assets: the value included in the image property set for the particular digital asset corresponding to the first criterion comprises an indication of a second geographic location (e.g., a second rectangular geographic region having a predefined location and certain defined dimensions, such as dimensions defined by a second number of digits appearing in a geohash string identifying the second geographic region). At Step 556, a further refinement of Step 554 is presented, wherein, the second geographic location is smaller than the first geographic region and is contained within the first geographic region (e.g., wherein the second number of digits appearing in the geohash string identifying the second geographic region is larger than the first number of digits appearing in the geohash string identifying the first geographic region). In one example, the first geographic region may comprise a geographic region defined by a 4-digit geohash string, and the second geographic region may comprise a geographic region defined by a 6-digit geohash string. In such an example, there may be 1,024 individual second geographic regions tiled within the first geographic region. As may be understood, the relative size difference between the first and second geographic regions may be modified to suit the needs of a given implementation, thus resulting in more (or fewer) potential second geographic regions existing within each first geographic region, thereby potentially providing more (or less) privacy with respect to the capture location property of DAs being submitted to the server device. In some such examples, a minimum size requirement may be placed upon the first geographic region, such that insights may not be learned by the server device within geographic regions any smaller than the minimum permissible size of the first geographic region.

Figure 5C:
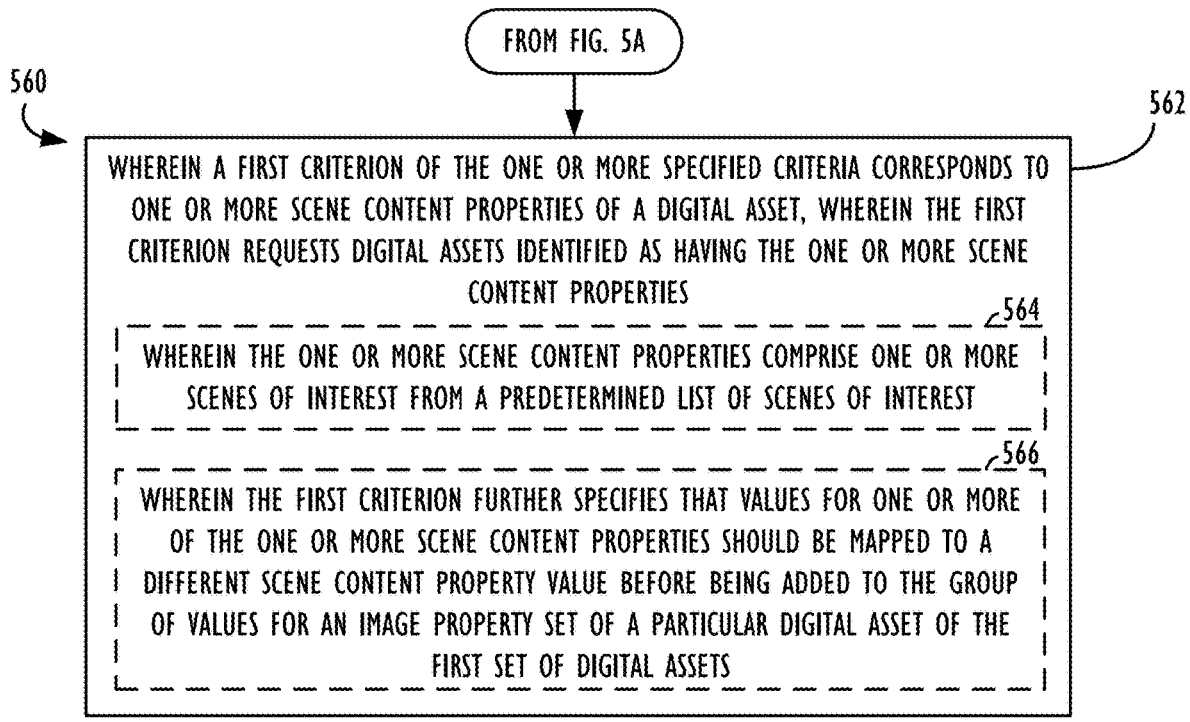

Turning now to FIG. 5C, a flowchart 560 is shown, illustrating additional details for enhancing and/or refining various steps of method 500 shown in FIG. 5A. Beginning with Step 562, an enhancement to Step 504 is described, wherein a first criterion of the one or more specified criteria corresponds to one or more scene content properties of a digital asset, wherein the first criterion requests digital assets identified as having the one or more scene content properties (e.g., a scene content property may comprise a scene tag associated with a captured DA and indicative of an identified person, place, location, event, topic, type of object, etc., appearing in the captured DA, or any other property related to a visual characteristic of the captured DA). At Step 564, a further refinement of Step 552 is presented, wherein the one or more scene content properties comprise one or more scenes of interest from a predetermined list of scenes of interest (e.g., a list of scenes that may be related to one another in a common taxonomy, such that various relationships, facets, and/or degrees of similarity between various scenes of interest may be estimated and used in meaningful ways to interpret received data).

At Step 566, another further refinement of Step 552 is presented, wherein the first criterion further specifies that values for one or more of the one or more scene content properties should be mapped to a different scene content property value before being added to the group of values for an image property set of a particular digital asset of the first set of digital assets. For example, in one case, scene of interest including: "eagle," "heron," "falcon," and "hawk" may all be mapped to a more generalized scene of interest, such as "bird," before being transmitted back to a server device. The remapping of property values of a DA may have multiple benefits. For one, remapping a scene of interest to a more generic scene of interest values (or a different scene of interest entirely) provides further privacy for the user by revealing less information about the true content of their captured DAs to a server device. Simultaneously, the remapping of property values of a DA may also benefit a server device attempting to perform analysis on received data. For instance, in the "bird" example above, if the individual bird types (i.e., "eagle," "heron," "falcon," and "hawk") are not remapped to a more generalized scene of interest (i.e., "bird") before submission to the server device, then there may not be enough data points relating to any one particular type of bird to rise above the noise threshold for the accumulated data at the server device.

In one example, if, say, 10 instances of a particular scene are required before the server device considers the particular scene to be indicative of actual data (i.e., to be above the noise threshold), then the submission of image property sets containing a total of 3 eagles, 2 herons, 4 falcons, and 6 hawks identified in DAs captured in a given geographic region would not rise above the "noise threshold" to allow the identification of any of those types of birds in the geographic region. On the other hand, if each of those types of birds were remapped to a common scene value, i.e., "bird," then the submission of a total of 15 "birds" identified in DAs captured in the given geographic region would exceed the "noise threshold" and allow the server device to identify the geographic region as a potential "Bird Watching" region, or the like, and drive or initiate appropriate user experiences based on the insight (e.g., place a link to a bird watching guide in a Maps application executing on a user's device if the user's device ever enters the geographic region).

Figure 5D:
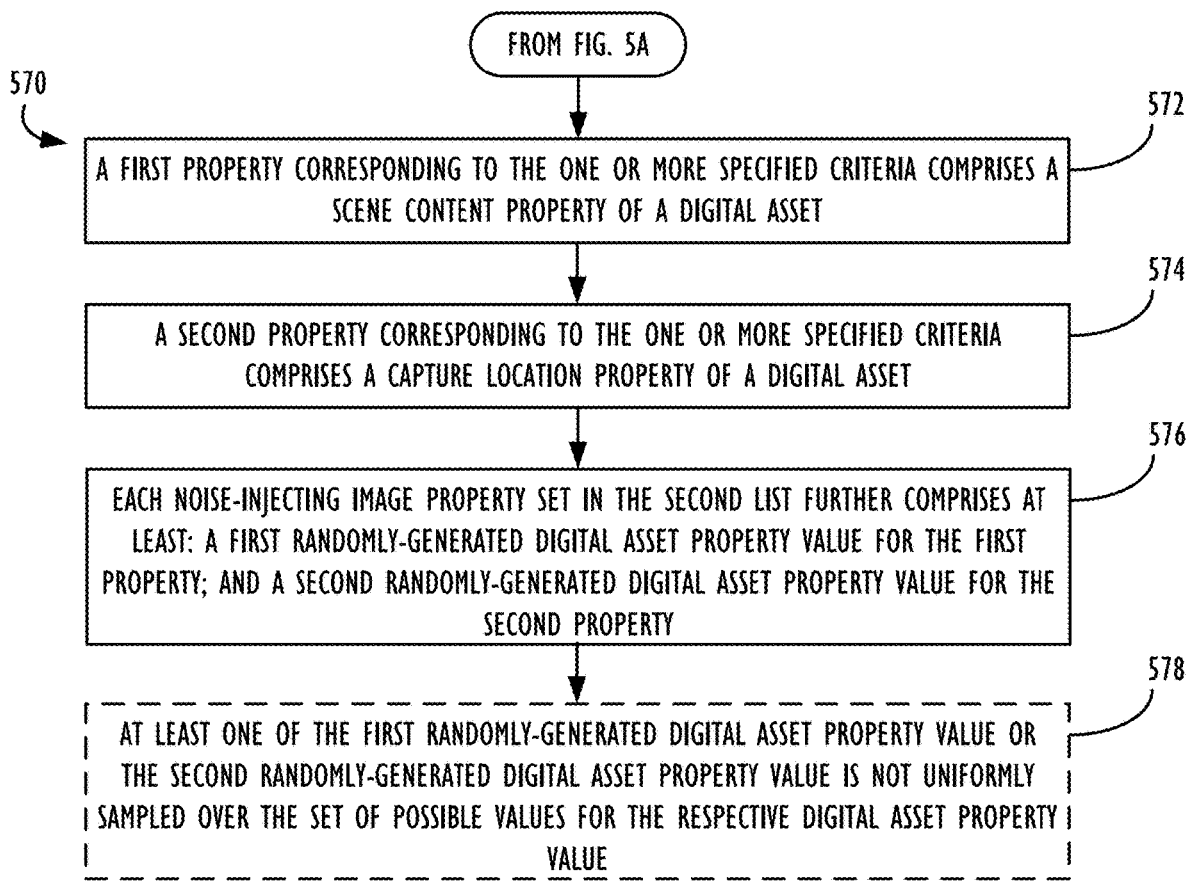

Turning now to FIG. 5D, a flowchart 570 is shown, illustrating additional details for enhancing and/or refining various steps of method 500 shown in FIG. 5A. Beginning with Step 572, wherein, in a particular case, a first property corresponding to the one or more specified criteria comprises a scene content property of a digital asset and, at Step 574, a second property corresponding to the one or more specified criteria comprises a capture location property of a digital asset. Next, at Step 576, each noise-injecting image property set in the second list may further comprise at least: a first randomly-generated digital asset property value for the first property (i.e., for the scene content property); and a second randomly-generated digital asset property value for the second property (i.e., for the location property). In some cases, if so desired, at least one of the first randomly-generated digital asset property value or the second randomly-generated digital asset property value is not uniformly sampled over the set of possible values for the respective digital asset property value, e.g., in order to increase (or decrease) the likelihood of the server receiving a particular noise value for either the first or the second property (Step 578). In this way, the noise in each "axis" (i.e., each type of property that noise information is intentionally added to) may be weighted and tuned independently from one another. It is to be understood that other axes (e.g., related to a capture time property of a DA) may also be considered (and/or independently weighted and tuned) as part of a given collection operation, e.g., in conjunction with scene content and capture location DA properties.

Figure 6A:
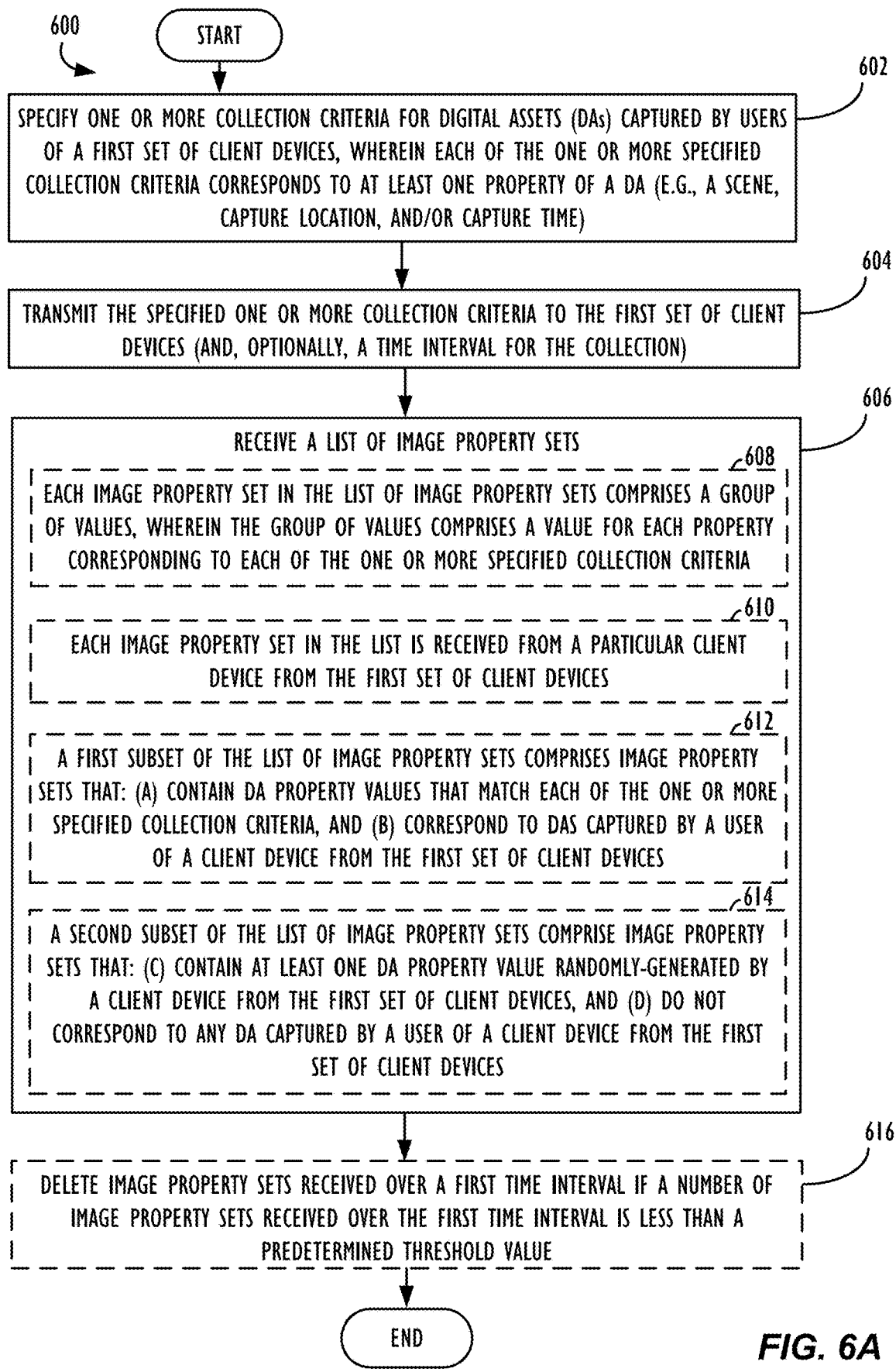
FIGS. 6A-6B are flow charts illustrating various details regarding a method of a server device specifying one or more collection criteria for DAs and receiving one or more image property sets from one or more client devices in a privacy-respectful manner, according to various embodiments.
Figure 6B:
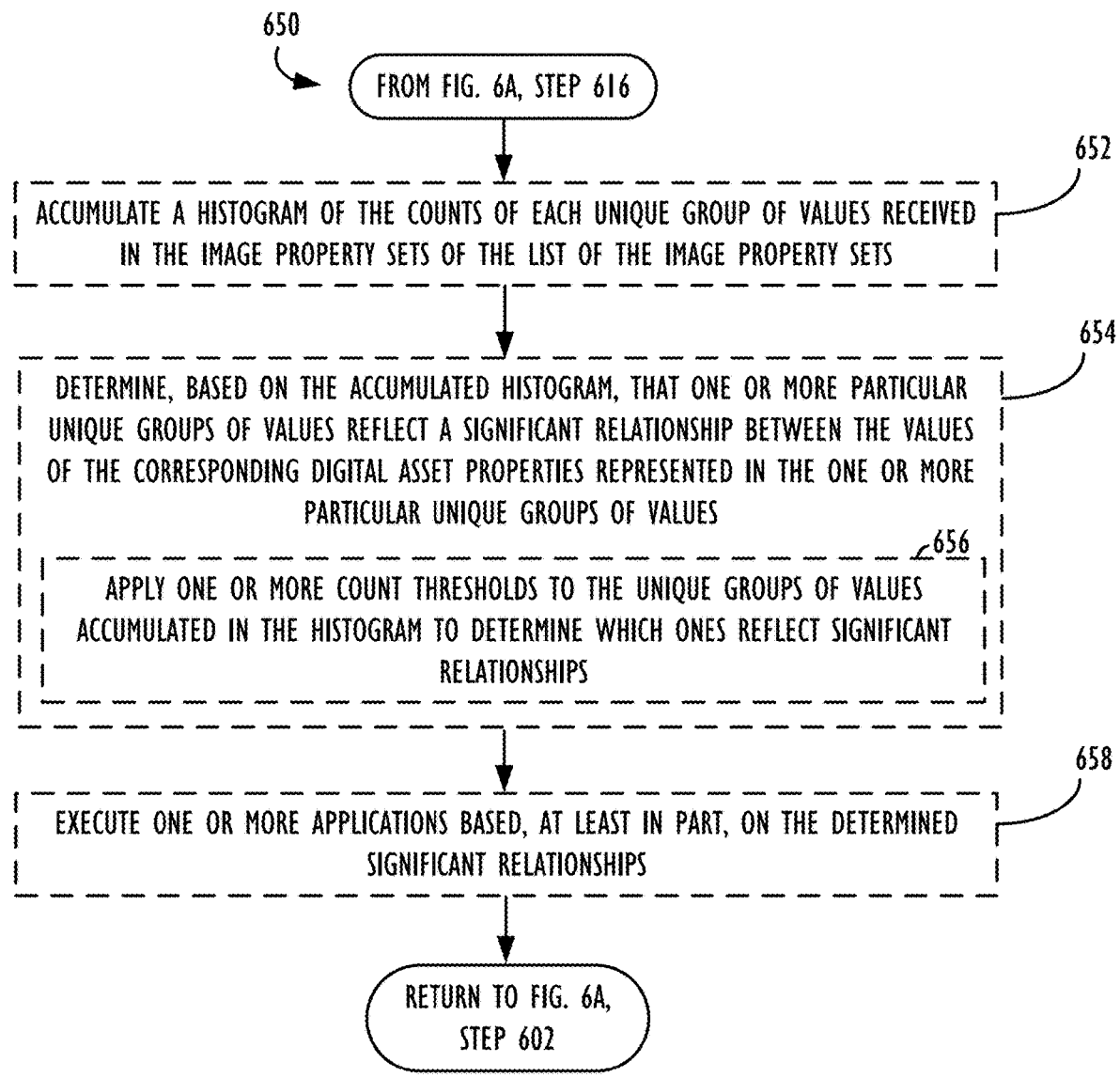

Exemplary Server Device Methods for Specifying Collection Criteria and Receiving and Analyzing Image Property Sets from Client Devices in a Privacy-Respectful Manner FIGS. 6A-6B are flow charts illustrating various details regarding a method of a server device specifying one or more collection criteria for DAs and receiving one or more image property sets from one or more client devices in a privacy-respectful manner, according to various embodiments.

Turning first to FIG. 6A, a method 600 is illustrated beginning with Step 602, wherein a server device may specify one or more collection criteria for digital assets (DAs) captured by users of a first set of client devices, wherein each of the one or more specified collection criteria corresponds to at least one property of a DA (e.g., a scene, capture location, and/or capture time). Next, at Step 604, the server device may transmit the specified one or more collection criteria to the first set of client devices (and, optionally, a time interval for the collection). For example, a time interval may specify that a given collection operation may only last for 1 day, 10 days, 1 month, etc. In this way, the privacy of users of client devices is further enhanced because information related to any particular collection operation is not collected in perpetuity.

Next, at Step 606, the server device may receive a list of image property sets. In some cases, each image property set in the list of image property sets may comprise a group of values (e.g., in the form of a concatenated list), wherein the group of values comprises a value for each property corresponding to each of the one or more specified collection criteria (Step 608). In other cases, each image property set in the list is received from a particular client device from the first set of client devices (Step 610). According to some embodiments, a first subset of the list of image property sets comprises image property sets that: (a) contain DA property values that match each of the one or more specified collection criteria, and (b) correspond to DAs captured by a user of a client device from the first set of client devices (Step 612), while a second subset of the list of image property sets comprise image property sets that: (c) contain at least one DA property value randomly-generated by a client device from the first set of client devices, and (d) do not correspond to any DA captured by a user of a client device from the first set of client devices (Step 614). As mentioned elsewhere herein, preferably, the server device cannot otherwise determine which image property sets relate to the first subset of the list (i.e., actual captured DAs of a user) and which image property sets relate to the second subset of the list (i.e. noise-injecting property sets, e.g., property sets containing at least one DA property value randomly-generated by a client device, and which does not correspond to any actual DA captured by a user of a client device).

Finally, at Step 616, the server device may optionally delete image property sets received over a first time interval if a number of image property sets received over the first time interval is less than a predetermined threshold value. For example, if the server device did not receive more than 100 image property sets relating to a given collection operation in the span of one day (even if the collection operation is set to span 10 days), then the image property sets received on that one day may be deleted and not included in any further analysis operations. If the number of image property sets received the next day does exceed the predetermined threshold value, however, then the results from the next day may be accumulated and/or included in any further desired analysis operations.

Turning now to FIG. 6B, a flowchart 650 is shown, illustrating additional details for extending the method 600 shown in FIG. 6A. Beginning with Step 652, following the performance of Step 606 from FIG. 6A (and/or optional Step 616), the server device may accumulate a histogram of the counts of each unique group of values received in the image property sets of the list of the image property sets (Step 652). Next, at Step 654, the server device may optionally determine, based on the accumulated histogram, that one or more particular unique groups of values reflect a significant relationship between the values of the corresponding digital asset properties represented in the one or more particular unique groups of values. In some cases, the determination of a significant relationship may comprise the server device applying one or more count thresholds to the unique groups of values accumulated in the histogram to determine which ones reflect significant relationships (e.g., any unique groups exceeding the one or more count thresholds may be considered to represent a significant relationship, such as the significant relationship between Region 1 and DAs with a scene type of "ocean," described above with reference to FIG. 3) (Step 656).

Finally, at Step 658, the server device may optionally execute one or more applications based, at least in part, on the determined significant relationships. For example, as discussed above, the server device may drive or initiate appropriate user experiences based on the insight gleaned from the determined significant relationship (e.g., place a URL link to an "ocean wildlife" article in a Maps application executing on a user's device if the user's device ever enters Region 1). Process flow may then return to Step 602 of FIG. 6A to execute the next collection operation, when the server device so desires.

In some implementations, it may be possible to conduct multiple searches with different collection criteria and combine the resulting learned significant relationships in useful ways to gain new insights that may not have been learnable by looking at the results of any one search individually. For example, two searches may use two different geographic resolutions, look for two different collections of scene types, look for different capture time ranges, etc. In a first implementation, a first search operation may learn that a particular region is a hot spot for "concerts," while a second search operation may learn that the particular region is a hot spot for "camping." Thus, by combining the insights from these independent search operations, an implementation may learn that a given region is popular for both concerts and camping, or a concert festival that many people camp at, or a camping site where it is popular to play music, etc. In some embodiments, compressed sensing or other machine learning-based techniques may be used to glean insights from the combined data sets from different search operations.

Exemplary Electronic Computing Devices

Figure 7:
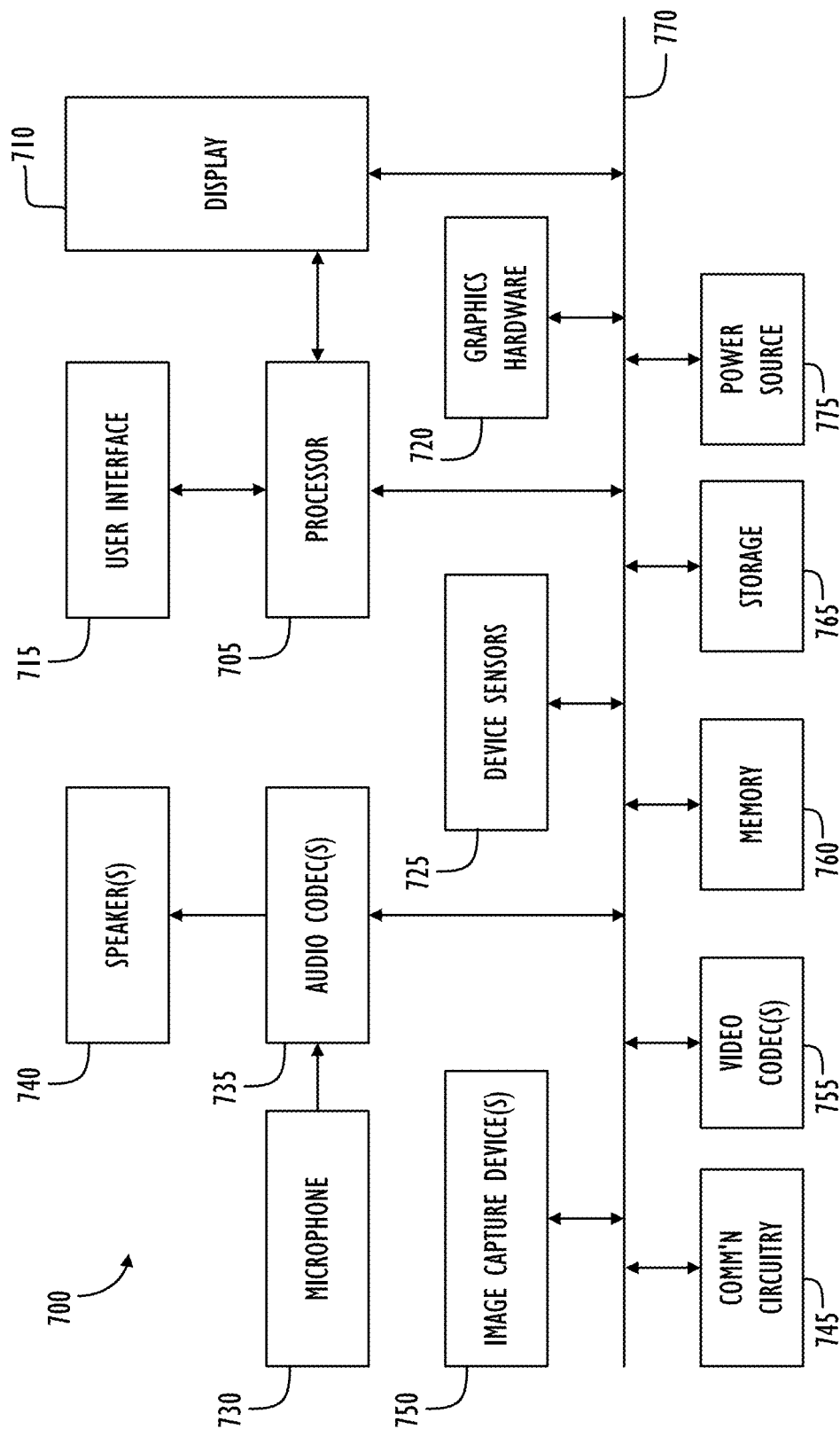
FIG. 7 is a block diagram illustrating a programmable electronic computing device, in which one or more of the techniques disclosed herein may be implemented.

Referring now to FIG. 7, a simplified functional block diagram of illustrative programmable electronic computing device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer, inertial measurement unit, and/or gyroscope), microphone 730, audio codec(s) 735, speaker(s) 740, communications circuitry 745, image capture device 750, which may, e.g., comprise multiple camera units/optical image sensors having different characteristics or abilities (e.g., Still Image Stabilization (SIS), HDR, OIS systems, optical zoom, digital zoom, etc.), video codec(s) 755, memory 760, storage 765, and communications bus 770.

Processor 705 may execute instructions necessary to carry out or control the operation of many functions performed by electronic device 700 (e.g., such as the generation and/or processing of images in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 710 may display a video stream as it is captured while processor 705 and/or graphics hardware 720 and/or image capture circuitry contemporaneously generate and store the video stream in memory 760 and/or storage 765. Processor 705 may be a system-on-chip (SOC) such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 750 may comprise one or more camera units configured to capture images, e.g., images which may be processed to learn iconic scenes and places appearing in said captured images in a privacy-respectful manner, e.g., in accordance with this disclosure. Output from image capture device 750 may be processed, at least in part, by video codec(s) 755 and/or processor 705 and/or graphics hardware 720, and/or a dedicated image processing unit or image signal processor incorporated within image capture device 750. Images so captured may be stored in memory 760 and/or storage 765. Memory 760 may include one or more different types of media used by processor 705, graphics hardware 720, and image capture device 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods or processes described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

As described above, one aspect of the present technology is the gathering and use of data available from various sources to improve the delivery to users of content-related suggestions. The present disclosure contemplates, that in some instances, this gathered data may include personal information data that uniquely identifies or can be used to contact or locate a specific person. Such personal information data can include demographic data, location-based data, telephone numbers, email addresses, social media handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content-related suggestions that are of greater interest and/or greater contextual relevance to the user. Accordingly, use of such personal information data enables users to have more streamlined and meaningful control of the content that they view and/or share with others. Further, other uses for personal information data that benefit the user are also contemplated by the present disclosure. For instance, health and fitness data may be used to provide insights into a user's general wellness, or state of well-being during various moments or events in their lives.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content-related suggestion services, the present technology can be configured to allow users to select to "opt in" or "opt out" of participation in the collection of personal information data during registration for services or anytime thereafter. In another example, users can select not to provide their content and other personal information data for improved content-related suggestion services. In yet another example, users can select to limit the length of time their personal information data is maintained by a third party, limit the length of time into the past from which content-related suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified, upon downloading an "App," that their personal information data will be accessed and then reminded again just before personal information data is accessed by the App.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, such as within certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for use by users by inferring preferences based on non-personal information data or a bare minimum amount of personal information, such as the quality level of the content (e.g., focus, exposure levels, musical quality or suitability, etc.) or the fact that certain content is being requested by a device associated with a contact of the user, other non-personal information available to the DAM system, or publicly available information.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory; and
   one or more processors operatively coupled to the memory, wherein the one or more processors are configured to execute instructions causing the one or more processors to:
   identify a first set of digital assets (DAs) related to a user of the device, wherein each digital asset in the first set of digital assets matches each of one or more specified criteria received from a server device, and wherein each of the one or more specified criteria correspond to at least one property of a digital asset, wherein a first property corresponding to at least one of the one or more specified criteria comprises a scene content property of a digital asset, and wherein a second property corresponding to at least one of the one or more specified criteria comprises a capture location property of a digital asset;
   generate a first list of image property sets,
   wherein the first list comprises an image property set for each digital asset in the first set of digital assets, and
   wherein each image property set in the first list comprises, for a particular digital asset from the first set of digital assets:
   a group of values for each of the particular digital asset's properties corresponding to the one or more specified criteria;
   generate a second list of image property sets,
   wherein the second list comprises a first number of noise-injecting image property sets, and
   wherein each noise-injecting image property set in the second list comprises:
   a group of generated digital asset property values corresponding to the one or more specified criteria, wherein at least one of the generated digital asset property values comprises a randomly-generated digital asset property value, and wherein each noise-injecting image property set in the second list further comprises at least: a first randomly-generated digital asset property value for the first property; and a second randomly-generated digital asset property value for the second property; and
   submit, to the server device, a third list of image property sets, wherein the third list of image property sets comprises the first list of image property sets and the second list of image property sets.

2. The device of claim 1, wherein the instructions to identify a first set of digital assets further comprise instructions configured to cause the one or more processors to:
   apply one or more user-specified privacy heuristics to the digital assets in the first set of digital assets; and
   filter out any digital assets from the first set of digital assets that do not meet the user-specified privacy heuristics.

3. The device of claim 1, wherein at least one of the one or more specified criteria correspond to one or more of:
   a scene content property of a digital asset;
   a capture location property of a digital asset; or
   a capture time property of a digital asset.

4. The device of claim 1, wherein a first criterion of the one or more specified criteria corresponds to a capture location property of a digital asset, and wherein the first criterion requests digital assets captured within a first geographic region.

5. The device of claim 4, wherein, for a particular digital asset from the first set of digital assets: the value included in the image property set for the particular digital asset corresponding to the first criterion comprises an indication of a second geographic location, wherein the second geographic location is smaller than the first geographic region and is contained within the first geographic region.

6. The device of claim 1, wherein a first criterion of the one or more specified criteria corresponds to one or more scene content properties of a digital asset, wherein the first criterion requests digital assets identified as having the one or more scene content properties.

7. The device of claim 6, wherein the first criterion further specifies that values for one or more of the one or more scene content properties should be mapped to a different scene content property value before being added to the group of values for an image property set of a particular digital asset of the first set of digital assets.

8. The device of claim 1, wherein:
   at least one of the first randomly-generated digital asset property value or the second randomly-generated digital asset property value is not uniformly sampled over the set of possible values for the respective digital asset property value.

9. An image processing method, comprising:

identifying a first set of digital assets related to a user of a device, wherein each digital asset in the first set of digital assets matches each of one or more specified criteria received from a server device, wherein each of the one or more specified criteria correspond to at least one property of a digital asset, wherein a first property corresponding to at least one of the one or more specified criteria comprises a scene content property of a digital asset, and wherein a second property corresponding to at least one of the one or more specified criteria comprises a capture location property of a digital asset;

generating a first list of image property sets,
- wherein the first list comprises an image property set for each digital asset in the first set of digital assets, and
- wherein each image property set in the first list comprises, for a particular digital asset from the first set of digital assets:
  - a group of values for each of the particular digital asset's properties corresponding to the one or more specified criteria;

generating a second list of image property sets,
- wherein the second list comprises a first number of noise-injecting image property sets, and
- wherein each noise-injecting image property set in the second list comprises:
  - a group of generated digital asset property values corresponding to the one or more specified criteria, wherein at least one of the generated digital asset property values comprises a randomly-generated digital asset property value, and wherein each noise-injecting image property set in the second list further comprises at least: a first randomly-generated digital asset property value for the first property; and a second randomly-generated digital asset property value for the second property; and submitting, to the server device, a third list of image property sets, wherein the third list of image property sets comprises the first list of image property sets and the second list of image property sets.

10. The method of claim 9, wherein:
at least one of the first randomly-generated digital asset property value or the second randomly-generated digital asset property value is not uniformly sampled over the set of possible values for the respective digital asset property value.

11. An image processing method, comprising:

specifying, by a server device, one or more collection criteria for digital assets captured by users of a first set of client devices, wherein each of the one or more specified collection criteria corresponds to at least one property of a digital asset;

transmitting, by the server device, the specified one or more collection criteria to the first set of client devices;

receiving, at the server device a list of image property sets, wherein:
- each image property set in the list of image property sets comprises a group of values, wherein the group of values comprises a value for each property corresponding to each of the one or more specified collection criteria,
- each image property set in the list is received from a particular client device from the first set of client devices,
- a first subset of the list of image property sets comprises image property sets that: (a) contain digital asset property values that match each of the one or more specified collection criteria, and (b) correspond to digital assets captured by a user of a client device from the first set of client devices, and
- a second subset of the list of image property sets comprise image property sets that: (c) contain at least one digital asset property value randomly-generated by a client device from the first set of client devices, and (d) do not correspond to any digital asset captured by a user of a client device from the first set of client devices; and deleting image property sets received at the server device over a first time interval if a number of image property sets received over the first time interval is less than a predetermined threshold value.

12. The method of claim 11, further comprising:
accumulating, by the server device, a histogram of a number of counts of each unique group of values received in the image property sets of the list of the image property sets.

13. The method of claim 12, further comprising:
determining, by the server device and based on the accumulated histogram, that one or more particular unique groups of values reflect a significant relationship between the values of the corresponding digital asset properties represented in the one or more particular unique groups of values, wherein a significant relationship comprises a given value exceeding a threshold number of counts.

14. The method of claim 11, wherein transmitting, by the server device, the specified one or more collection criteria to the first set of client devices further comprises:
transmitting, by the server device, a time interval for which image property sets related to the specified one or more collection criteria will be received.

15. The method of claim 11, wherein a first criterion of the one or more specified collection criteria corresponds to a capture location property of a digital asset, and wherein the first criterion requests digital assets captured within a first geographic region.

16. The method of claim 15, wherein, for at least one image property set in the list of image property sets: a value included in the respective image property set corresponding to the first criterion comprises an indication of a second geographic location, wherein the second geographic location is smaller than the first geographic region and is contained within the first geographic region.

17. The method of claim 11, wherein a first criterion of the one or more specified criteria corresponds to one or more scene content properties of a digital asset, wherein the first criterion requests digital assets identified as having the one or more scene content properties.

* * * * *

UNITED STATES PATENT AND TRADEMARK OFFICE
CERTIFICATE OF CORRECTION

| | | |
|---|---|---|
| PATENT NO. | : 12,243,308 B2 | Page 1 of 1 |
| APPLICATION NO. | : 17/658474 | |
| DATED | : March 4, 2025 | |
| INVENTOR(S) | : Michael Chatzidakis et al. | |

It is certified that error appears in the above-identified patent and that said Letters Patent is hereby corrected as shown below:

In the Specification

Column 11, Line 48: at the beginning of the line - delete the first "then"

In the Claims

Claim 1, Column 25, Line 52: delete "and" after -- device, --

Signed and Sealed this
Eighth Day of April, 2025

Coke Morgan Stewart
*Acting Director of the United States Patent and Trademark Office*